(12) United States Patent
Iwane et al.

(10) Patent No.: US 8,498,844 B2
(45) Date of Patent: Jul. 30, 2013

(54) OPTIMIZATION PROCESSING METHOD AND APPARATUS

(75) Inventors: Hidenao Iwane, Kawasaki (JP); Hirokazu Anai, Kawasaki (JP); Hitoshi Yanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 13/009,041

(22) Filed: Jan. 19, 2011

(65) Prior Publication Data

US 2011/0184706 A1    Jul. 28, 2011

(30) Foreign Application Priority Data

Jan. 26, 2010  (JP) ................. 2010-014062

(51) Int. Cl.
*G06F 7/60*   (2006.01)
*G06F 17/10*  (2006.01)

(52) U.S. Cl.
USPC ............................................. 703/2

(58) Field of Classification Search
USPC ............................................. 703/2
See application file for complete search history.

(56) References Cited

U.S. PATENT DOCUMENTS

| | | | |
|---|---|---|---|
| 7,516,423 | B2 | 4/2009 | De Smedt et al. |
| 2005/0159935 | A1* | 7/2005 | Orii et al. ............ 703/2 |
| 2005/0257178 | A1 | 11/2005 | Daems et al. |
| 2006/0080066 | A1* | 4/2006 | Orii et al. ............ 703/1 |
| 2007/0244574 | A1* | 10/2007 | Orii et al. ............ 700/31 |
| 2011/0112811 | A1* | 5/2011 | Matsumoto ........... 703/2 |

OTHER PUBLICATIONS

Anai, Hirokazu, Shigeo Orii, and Katsuhisa Horimoto. "Symbolic-numeric estimation of parameters in biochemical models by quantifier elimination." Journal of Bioinformatics and Computational Biology 4.05 (2006): 1097-1117.*
Sawada, Hiroyuki, and Xiu-Tian Yan. "Application of Gröbner bases and quantifier elimination for insightful engineering design." Mathematics and Computers in Simulation 67.1 (2004): 135-148.*
Weispfenning, Volker. "Simulation and optimization by quantifier elimination." Journal of Symbolic Computation 24.2 (1997): 189-208.*
Anai, Hirokazu et al., "Design Technology Based on Symbolic Computation", Fujitsu, vol. 60, No. 5, Sep. 2009, pp. 514-521.
Anai, Hirokazu et al., "Introduction to Computational Real Algebraic Geometry, Series No. 1", Mathematics Seminar, vol. 554, Nippon-Hyoron-sha Co., Ltd., Nov. 2007, pp. 64-70.

(Continued)

*Primary Examiner* — Mary C Jacob
*Assistant Examiner* — Aniss Chad
(74) *Attorney, Agent, or Firm* — Fujitsu Patent Center

(57) ABSTRACT

A first model expression having a first order and representing a relationship between evaluation indicators and the design parameters and a second model expression having a second order higher than the first order and representing a relationship between them are generated. Then, according to a quantifier elimination method, values of the design parameters, which realize an optimum solution of the first model expression, are calculated. And, a design parameter whose value is identical to an upper limit value or a lower limit value is identified, and the second model expression is transformed by substituting the upper limit value or the lower limit value, as a value of the identified design parameter, for the second model expression. Finally, according to the quantifier elimination method, values of the design parameters in the transformed second model expression, which realize an optimum solution of the transformed second model expression, is calculated.

7 Claims, 15 Drawing Sheets

OTHER PUBLICATIONS

Jirstrand, Mats "Cylindrical Algebraic Decomposition—an Introduction", Oct. 18, 1995.

Anai, Hirokazu et al., "Introduction to Computational Real Algebraic Geometry, Series No. 2", Mathematics Seminar, vol. 555., Nippon-Hyoron-sha Co., Ltd. Dec. 2007, p. 75-81, with English-language Translation.

Anai, Hirokazu et al., "Introduction to Computational Real Algebraic Geometry, Series No. 3",Mathematics Seminar, vol. 556, Nippon-Hyoron-sha Co., Ltd. Jan. 2008, p. 76-83, with P English-language Translation.

Anai, Hirokazu et al., "Introduction to Computational Real Algebraic Geometry, Series No. 4",Mathematics Seminar, vol. 558, Nippon-Hyoron-sha Co., Ltd. Mar. 2008, p. 79-85, English-language Translation.

Anai, Hirokazu et al., "Introduction to Computational Real Algebraic Geometry, Series No. 5",Mathematics Seminar, vol. 559, Nippon-Hyoron-sha Co., Ltd. Apr. 2008, p. 82-89, with English-language Translation.

* cited by examiner

OPTIMIZATION PROBLEM WITH CONSTRAINTS

Maximize $-x-2y-5z$

Subject to $2x+3y+z=7, x+y \geqq 1, x \geqq 0, y \geqq 0, z \geqq 0$

FIG.9A

QE PROBLEM $\underbrace{\exists x \exists y \exists z}_{A} \underbrace{(s \leqq -x-2y-5z}_{B} \underbrace{\wedge}_{C}$ $2x+3y+z=7 \underbrace{\wedge}_{C} x+y \geqq 1 \underbrace{\wedge}_{C} x \geqq 0 \underbrace{\wedge}_{C} y \geqq 0 \underbrace{\wedge}_{C} z \geqq 0)$

FIG.9B

OPTIMIZATION PROBLEM WITH CONSTRAINTS

Maximize $\min(F11, F12)$

Subject to $0 \leqq x_i \leqq 1$ $(1 \leqq i \leqq 7)$

FIG.10

OPTIMIZATION PROCESSING METHOD AND APPARATUS

CROSS-REFERENCE TO RELATED APPLICATIONS

This application is based upon and claims the benefit of priority of the prior Japanese Patent Application No. 2010-014062, filed on Jan. 26, 2010, the entire contents of which are incorporated herein by reference.

FIELD

This technique relates to an optimization technique by computer algebra.

BACKGROUND

In the design stage of producing goods, design conditions are expressed as a function (in other words, an objective function) of predetermined design parameters, and design parameters are set so that the value of the objective function becomes, for example, minimum. At that time, after the designer determines the basic shape, the designer sets the allowable range of fluctuation for each design parameter and performs optimization within the design parameter space. However, when attempting to search the entire design parameter space in the case of a large number of design parameters, an explosion of combinations occur resulting in an enormous number of combinations, thus making calculation impossible in real time.

There are a large number of techniques to carry out such optimization processing at high speed by the numeral calculation.

On the other hand, in an optimization design by computer simulation, there is a method called optimization by computer algebra. In such a method, computer simulation is performed for the values of various design parameters, and output evaluation indicators are calculated for each individual case. Then, model expressions that approximate the relationships between the design parameters and output evaluation indicators are calculated, and optimization by the computer algebra is carried out based on these model expressions. As a processing for the optimization, expressions that represent the relationship between cost and performance are calculated from the obtained approximate expressions and constraints.

Incidentally, as for the computer algebra, a Quantifier Elimination (QE) method is known. This technique is a technique that an expression "$\exists x\ (x^2+bx+c=0)$", for example, is changed to an equivalent expression "$b^2-4c \geqq 0$" by eliminating quantifiers such as "$\exists$ and $\forall$".

Specifically, the QE method is described in the following document. However, because a lot of documents for the QE method exist, useful documents other than the following document exist. This document is incorporated herein by reference.

Jirstrand Mats, "Cylindrical Algebraic Decomposition—an Introduction", Oct. 18, 1995.

However, there is a problem that the amount of calculation is large even using QE. Therefore, it becomes necessary to simplify the problem by reducing the number of constraints, or to simplify the model by decreasing the order of the model expression, or reducing the number of variables and terms. However, such a kind of simplification increases error. Therefore, the influence is large, when searching for one point that provides the optimum solution.

Namely, the conventional arts cannot carry out the optimization processing solving the aforementioned problem at high speed by the computer algebra.

SUMMARY

This optimization processing method includes: (A) obtaining values of evaluation indicators by generating a plurality of sets of values of design parameters and causing a simulator to carryout simulation for each of the plurality of sets, and generating a first model expression having a first order and representing a relationship between the evaluation indicators and the design parameters and a second model expression having a second order higher than the first order and representing a relationship between the evaluation indicators and the design parameters, and storing the first model expression and the second model expression into a model expression storage unit; (B) calculating values of the design parameters, which realize an optimum solution of the first model expression, according to a quantifier elimination method, from the first model expression stored in the model expression storage unit and a predetermined constraint, and storing the calculated values of the design parameters into a design parameter value storage unit; (C) identifying a design parameter whose value stored in the design parameter value storage unit is identical to an upper limit value or a lower limit value, which is included in the predetermined constraint, and transforming the second model expression by substituting the upper limit value or the lower limit value, as a value of the identified design parameter, for the second model expression stored in the model expression storage unit; and (D) calculating values of the design parameters in the transformed second model expression, which realize an optimum solution of the transformed second model expression, from the transformed second model expression and a constraint relating to the design parameters in the transformed second model expression, and storing the calculated values of the design parameters in the transformed second model expression into the design parameter value storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9A is a diagram depicting an example of an optimization problem with constraints;

FIG. 9B is a diagram depicting an example of a QE problem;

FIG. 10 is a diagram depicting an example or an optimization problem with constraints;

DESCRIPTION OF EMBODIMENTS

In an embodiment of the present technique, physical quantities (for example, length, thickness, etc.) of the design target object are used as design parameters, and together with optimizing (for example, minimizing or maximizing) the value of an objective function, which is a function of those design parameters, design parameter values for achieving the optimal value are calculated with high accuracy. More specifically, an example is presented of designing the shape of a Static Random Access Memory (SRAM) as part of a semiconductor design. In the design of the SRAM shape, the cell voltage, load gate length, driver gate length, transfer gate length, load width, driver width, transfer width, word line potential, load Vth, driver Vth, and transfer Vth, for example, are used as design parameters.

In this embodiment, simulation is performed while fluctuating the design parameter values within predetermined fluctuation ranges, and the objective function is identified by modeling, from the simulation results, the relationship between the design parameters and the evaluation indicators, which are the simulation results. In the design of the SRAM shape, highly accurate modeling is required, with linear models being inadequate. However, it is known that design parameter values that provide optimal solution of the objective function are often the upper limit values or lower limit values of the design parameters. For example, when the range of values of a design parameter is defined as being not less than 0 and not greater than 1, the lower limit value is 0, and the upper limit value is 1. However, various factors come into play when determining whether the optimal design parameter value will be the lower limit value or the upper limit value, and particularly, when it is necessary to evaluate a plurality of evaluation indicators at the same time, it is not possible to uniquely identify beforehand whether the optimal design parameter value becomes an upper limit value or lower limit value.

In this embodiment, such characteristics are used. As long as such characteristics exist, this embodiment can be applied to design other than the design of the SRAM shape.

Figure 1:
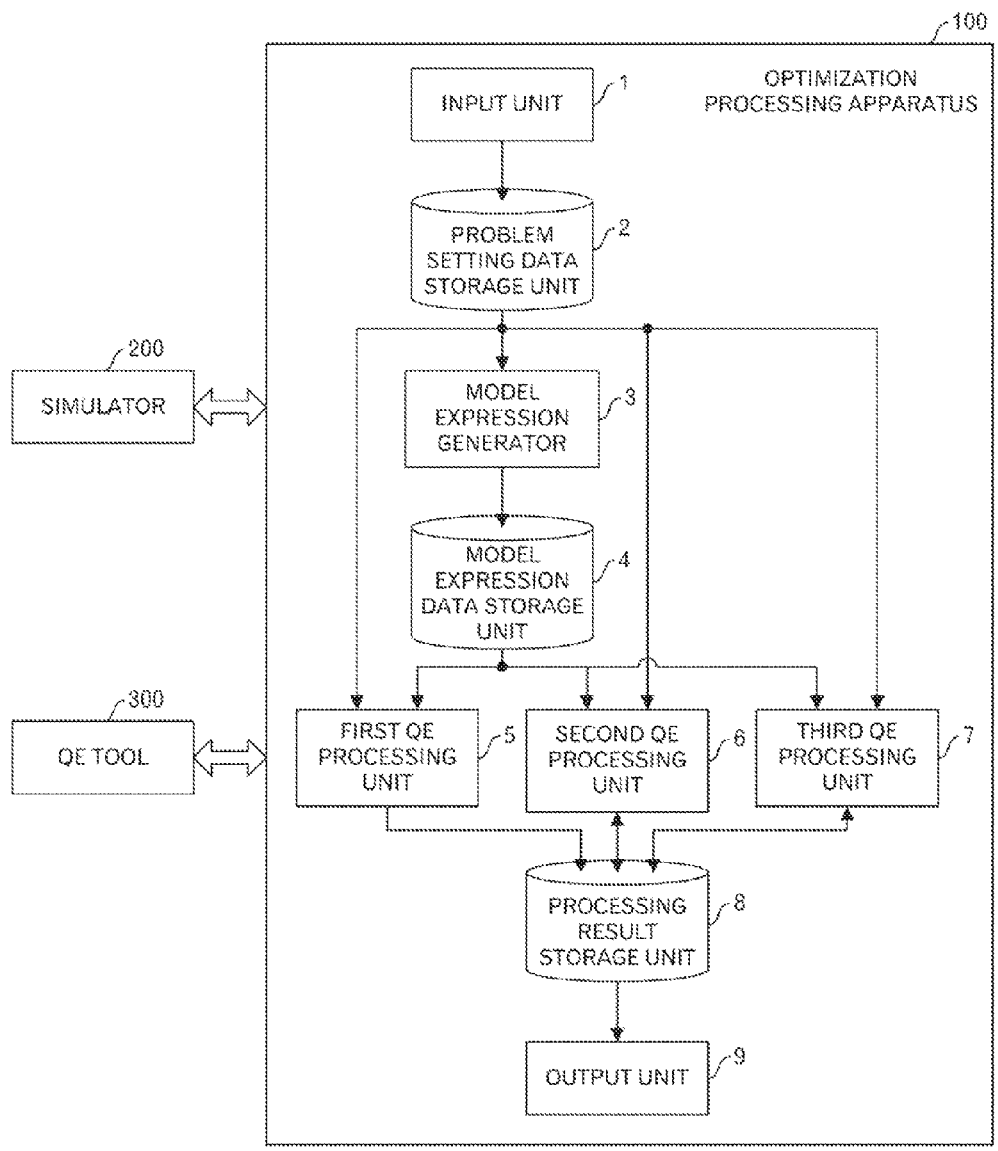
FIG. 1 is a functional block diagram depicting an optimization processing apparatus.

FIG. 1 depicts a functional block diagram of an optimization processing apparatus 100 relating to one embodiment of this technique. The optimization processing apparatus 100 includes (A) an input unit 1 that accepts inputs such as data from a designer for problem settings; (B) a problem setting data storage unit 2 that stores data received by the input unit 1; (C) a model expression generator 3 that carries out a model expression generation processing by using the data stored in the problem setting data storage unit 2; and (D) a model expression data storage unit 4 that stores the processing results of the model expression generator 3.

The optimization processing apparatus 100 also includes: (E) a first QE processing unit 5 that carries out a processing using the data stored in the problem setting data storage unit 2 and model expression data storage unit 4; (F) a processing result storage unit 8 that stores the processing results of the first QE processing unit 5 and the like; (G) a second QE processing unit 6 that carries out a processing using the data stored in the problem setting data storage unit 2, model expression data storage unit 4 and processing result storage unit 8; (H) a third QE processing unit 7 that carries out a processing using the data stored in the problem setting data storage unit 2, model expression data storage unit 4 and processing result storage unit 8; and (I) an output unit 9 that outputs the data stored in the processing result storage unit 8.

A simulator 200 that is executed on a computer, which is provided separately from the optimization processing apparatus 100 and connected via a network to the optimization processing apparatus 100 is a Simulation Program with Integrated Circuit Emphasis (SPICE) simulator, for example, and operates together with the model expression generator 3 of the optimization processing apparatus 100. However, the simulator 200 in some cases may be executed in the optimization processing apparatus 100.

Furthermore, a QE tool 300 that is executed on a computer, which is provided separately from the optimization processing apparatus 100 and connected via a network to the optimization processing apparatus 100, operates together with the first through third QE processing units 5 to 7 of the optimization processing apparatus 100. However, the QE tool 300 in some cases may be executed in the optimization processing apparatus 100. When the QE tool 300, as explained in the description of the conventional art, obtains a model expression such as $x^2+bx+c=0$, the QE tool 300 uses a known qualifier elimination method to carry out a processing to obtain, for example, $b^2-4c \geqq 0$ as the range in which x exists.

Next, a processing by the optimization processing apparatus 100 depicted in FIG. 1 will be explained using FIG. 2 to FIG. 15.

The designer inputs data for problem setting to the optimization processing apparatus 100. The input unit 1 of the optimization processing apparatus 100 accepts the data for problem setting from the designer and stores such data into the problem setting data storage unit 2 (step S1). For example, an evaluation indicator F1=SNM (Static Noise Margin) and evaluation indicator F2=WM (Write Margin) are designated, and the minimum value of the evaluation indicators F1 and F2 (min (F1, F2)) is designated as an objective function. Furthermore, $x_1$ to $x_7$ are designated as design parameters, and $0 \leq x_1 \leq 1$ is designated as the constraints (also called the constraint expression) for these design parameters. Such data is stored into the problem setting data storage unit 2.

Next, the model expression generator 3 carries out a model expression generation processing by using the data stored in the problem setting data storage unit 2 (step S3). This model expression generation processing will be explained using FIG. 3 to FIG. 7.

Figures 3, 4:
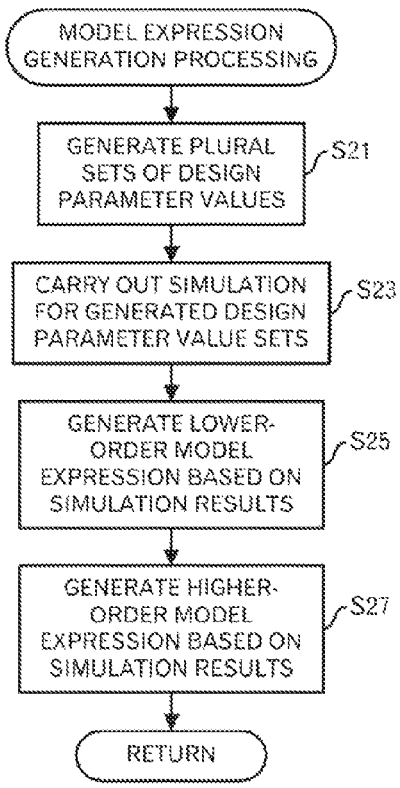
FIG. 3 is a diagram depicting a processing flow of a model expression generation processing.
FIG. 4 is a diagram depicting an example of data stored in a model expression storage unit.

First, the model expression generator 3 generates plural sets of design parameter values according to constraints stored in the problem setting data storage unit 2 by using a known method such as the Latin Hypercube sampling method or the like, and stores the processing results into the model expression data storage unit 4, for example (step S21). For example, as depicted in FIG. 4, plural sets of values of the design parameters $x_1$ to $x_7$ are generated so as to satisfy the constraints. In the example of FIG. 4, the values for F1 and F2 will be registered, however, at this step, the values have not yet been registered.

Then, the model expression generator 3 causes the simulator 200 to carry out simulation for each set of the generated design parameter values, acquires the values of the evaluation indicators F1 and F2 from the simulator 200, and stores the values into the model expression data storage unit 4, for example (step S23). At this stage, as depicted in FIG. 4, the value of the evaluation indicator F1 and value for the evaluation indicator F2 are registered in each line.

Figure 5:
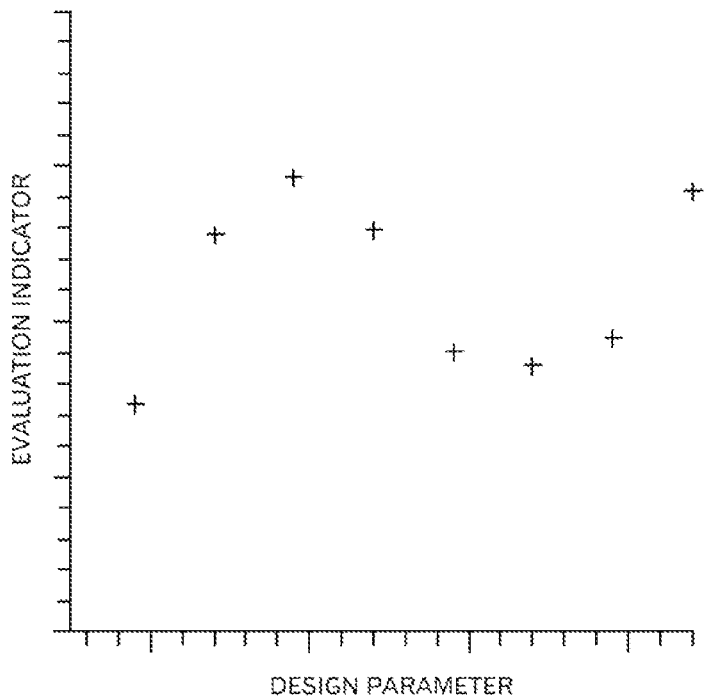
FIG. 5 is a diagram schematically depicting simulation results.
Figure 6:
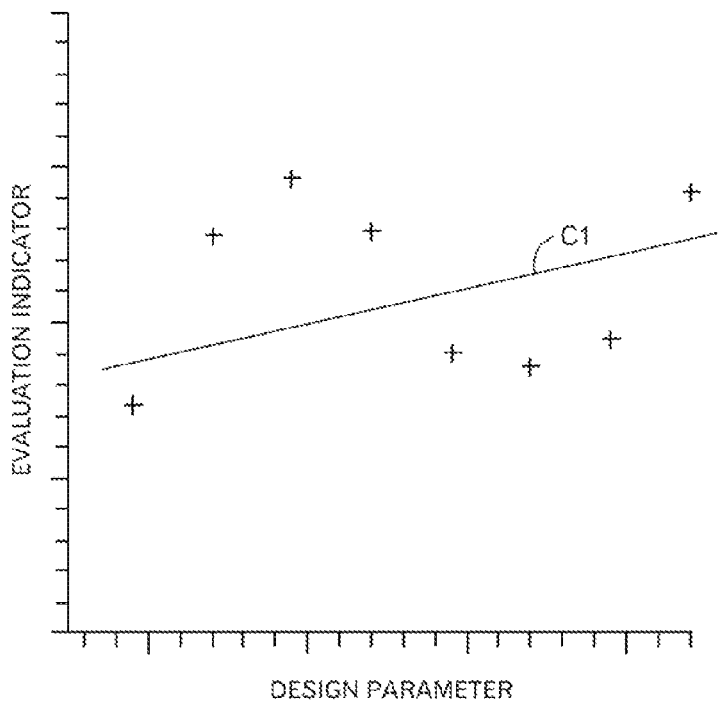
FIG. 6 is a diagram schematically depicting derivation of a lower-order model expression.

In addition, the model expression generator 3 generates lower-order (for example, a linear) model expressions based on the simulation results using a method such as the least squares, and stores the data for that model expression into the model expression data storage unit 4 (step S25). For example, presuming there is one design parameter, the simulation results that were obtained at the step S23 can be expressed in a graph as depicted in FIG. 5. In FIG. 5, the horizontal axis expresses the design parameter value, and the vertical axis expresses the evaluation index value. Then, in such a space, it is possible to plot the input (in other words, the parameter value) to the simulator 200 and the output (evaluation indicator value by the simulation). At this step, a linear model expression is generated using the method of least squares, for example. As depicted in FIG. 6, in the case of FIG. 5, a straight line C1 is calculated as the model expression.

For example, when the design parameters includes $x_1$ to $x_7$, a lower-order model expression expressing the relationship between those design parameters and the evaluation indicator F1, and a lower-order model expression expressing the relationship between those design parameters and the evaluation indicator F2 are stored into the model expression data storage unit 4.

Then, it is assumed that the following model expressions have been obtained, for example. In the case of the linear model, the model expressions are notated as F11 and F12.

$$F11 = a_{f1}x_1 + b_{f1}x_2 + c_{f1}x_3 + d_{f1}x_4 + e_{f1}x_5 + g_{f1}x_6 + h_{f1}x_7 + j_{f1}$$

$a_{f1} = -0.5097202330$
$b_{f1} = 0.3700573111$
$c_{f1} = 3.149789870$
$d_{f1} = 0.8499251501$
$e_{f1} = 1.003115639$
$g_{f1} = 1.830582482$
$h_{f1} = -1.773042397$
$i_{f1} = 3.822110026$ $$F12 = a_{f2}x_1 + b_{f2}x_2 + c_{f2}x_3 + d_{f2}x_4 + e_{f2}x_5 + g_{f2}x_6 + h_{f2}x_7 + j_{f2}$$

$a_{f2} = 0.8919254982$
$b_{f2} = 0.8413125353$
$c_{f2} = 0.2787169722$
$d_{f2} = 0.1167763638$
$e_{f2} = 0.2065783541$
$g_{f2} = -0.3208585781$
$h_{f2} = 3.740383339$
$j_{f2} = 2.948142427$

Figure 7:
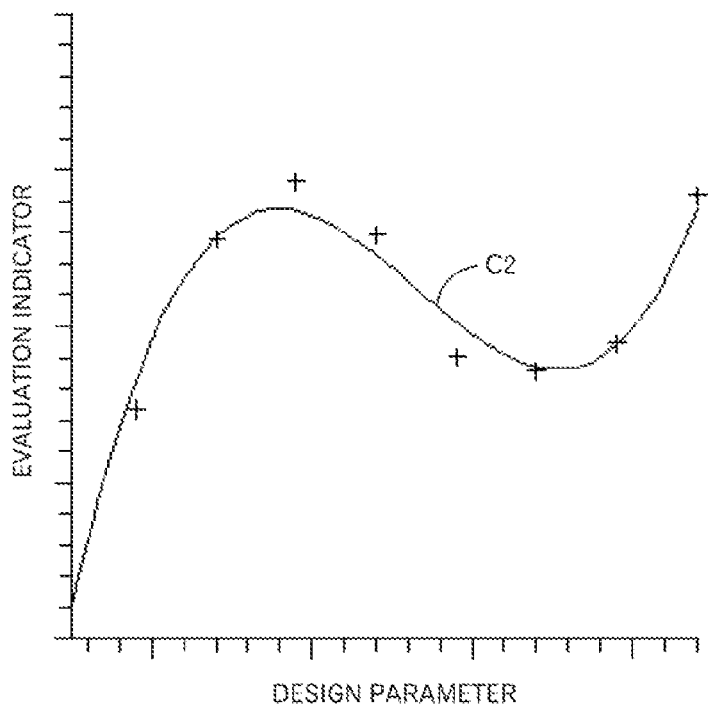
FIG. 7 is a diagram schematically depicting derivation of a higher-order model expression.

Furthermore, the model expression generator 3 generates higher-order (for example, 2nd order) model expressions based on the simulation results using a method such as the least squares, and stores the data for that model expression into the model expression data storage unit 4 (step S27). The thinking behind this step is basically the same as that of the step S25, however, as illustrated in FIG. 7 for example, a higher-order model expression such as curve C2 is calculated.

For example, when the design parameters include $x_1$ to $x_7$, a higher-order model expression expressing the relationship between those design parameters and the evaluation indicator F1, and a higher-order model expression expressing the relationship between the design parameters and the evaluation indicator F2 are stored into the model expression data storage unit 4.

Then, it is assumed that the following model expressions have been obtained, for example. In the case of the 2nd-order model, the model expressions are notated as F21 and F22.

$$F21 = a_{f21\_1}x_7x_6 + a_{f21\_2}x_7x_1 + a_{f21\_3}x_7x_2 + a_{f21\_4}x_7x_3 +$$
$$a_{f21\_5}x_7x_4 + a_{f21\_6}x_7x_5 + a_{f21\_7}x_2x_1 + a_{f21\_8}x_3x_1 +$$
$$a_{f21\_9}x_3x_2 + a_{f21\_10}x_4x_1 + a_{f21\_11}x_4x_2 + a_{f21\_12}x_4x_3 +$$
$$a_{f21\_13}x_5x_1 + a_{f21\_14}x_5x_2 + a_{f21\_15}x_1^2 + a_{f21\_16}x_2^2 +$$
$$a_{f21\_17}x_4^2 + a_{f21\_18}x_5^2 + a_{f21\_19}x_6^2 + a_{f21\_20}x_7^2 +$$
$$a_{f21\_21}x_3^2 + a_{f21\_22}x_5x_3 + a_{f21\_23}x_5x_4 + a_{f21\_24}x_6x_1 +$$
$$a_{f21\_25}x_6x_2 + a_{f21\_26}x_6x_3 + a_{f21\_27}x_6x_4 + a_{f21\_28}x_6x_5 +$$
$$a_{f21\_29}x_1 + a_{f21\_30}x_2 + a_{f21\_31}x_3 + a_{f21\_32}x_5 +$$
$$a_{f21\_33}x_4 + a_{f21\_34}x_6 + a_{f21\_35}x_7 + 3.376260999$$

$a_{f21\_1} = -0.5327281416 \cdot 10^{-1}$
$a_{f21\_2} = -0.5583915742 \cdot 10^{-1}$
$a_{f21\_3} = -0.3720116143 \cdot 10^{-1}$
$a_{f21\_4} = -0.3555570925$
$a_{f21\_5} = -0.2366679797$
$a_{f21\_6} = -0.5428040291$
$a_{f21\_7} = 0.3405778185 \cdot 10^{-1}$
$a_{f21\_8} = -0.2469718687 \cdot 10^{-1}$
$a_{f21\_9} = 0.2325896773$
$a_{f21\_10} = -0.1779069165$
$a_{f21\_11} = 0.1763752637 \cdot 10^{-1}$
$a_{f21\_12} = -0.1180285669$
$a_{f21\_13} = -0.9948460020 \cdot 10^{-1}$
$a_{f21\_14} = -0.1398161598 \cdot 10^{-2}$
$a_{f21\_15} = 0.1922736364$
$a_{f21\_16} = 0.1045767461$
$a_{f21\_17} = -0.8073282286$
$a_{f21\_18} = -1.501220274$ -continued $a_{f21\_19} = -0.9491453677$ $a_{f21\_20} = 0.4114223556 \cdot 10^{-1}$ $a_{f21\_21} = -2.041782101$ $a_{f21\_22} = 0.4681773723$ $a_{f21\_23} = 0.7318819901$ $a_{f21\_24} = 0.1258968718 \cdot 10^{-1}$ $a_{f21\_25} = 0.2950960306 \cdot 10^{-1}$ $a_{f21\_26} = 0.5600679929$ $a_{f21\_27} = 0.2956285145$ $a_{f21\_28} = 0.1514279483$ $a_{f21\_29} = -0.5294329115$ $a_{f21\_30} = -0.5555781101$ $a_{f21\_31} = 4.794612954$ $a_{f21\_32} = 2.239313408$ $a_{f21\_33} = 1.505460861$ $a_{f21\_34} = 2.391000399$ $a_{f21\_35} = -1.238547968$ $$F22 = b_{f22\_1}x_7x_6 + b_{f22\_2}x_7x_1 + b_{f22\_3}x_7x_2 + b_{f22\_4}x_7x_3 + \\ b_{f22\_5}x_7x_4 + b_{f22\_6}x_7x_5 + b_{f22\_7}x_2x_1 + b_{f22\_8}x_3x_1 + \\ b_{f22\_9}x_3x_2 + b_{f22\_10}x_4x_1 + b_{f22\_11}x_4x_2 + b_{f22\_12}x_4x_3 + \\ b_{f22\_13}x_5x_1 + b_{f22\_14}x_5x_2 + b_{f22\_15}x_1^2 + b_{f22\_16}x_2^2 + \\ b_{f22\_17}x_4^2 + b_{f22\_18}x_5^2 + b_{f22\_19}x_6^2 + b_{f22\_20}x_7^2 + \\ b_{f22\_21}x_3^2 + b_{f22\_22}x_5x_3 + b_{f22\_23}x_5x_4 + b_{f22\_24}x_6x_1 + \\ b_{f22\_25}x_6x_2 + b_{f22\_26}x_6x_3 + b_{f22\_27}x_6x_4 + b_{f22\_28}x_6x_5 + \\ b_{f22\_29}x_1 + b_{f22\_30}x_2 + b_{f22\_31}x_3 + b_{f22\_32}x_5 + \\ b_{f22\_33}x_4 + b_{f22\_34}x_6 + b_{f22\_35}x_7 + 2.820263763$$

$b_{f22\_1} = 0.4797137112$ $b_{f22\_2} = 0.7289112590 \cdot 10^{-1}$ $b_{f22\_3} = 0.2826011518$ $b_{f22\_4} = -0.5951764022 \cdot 10^{-2}$ $b_{f22\_5} = -0.1434153779 \cdot 10^{-1}$ $b_{f22\_6} = 1.426159555$ $b_{f22\_7} = 0.6673936258 \cdot 10^{-1}$ $b_{f22\_8} = -0.1251937442$ $b_{f22\_9} = 0.7420715050 \cdot 10^{-1}$ $b_{f22\_10} = -0.2232689472 \cdot 10^{-2}$ $b_{f22\_11} = 0.1279242286 \cdot 10^{-1}$ $b_{f22\_12} = -0.3626387467 \cdot 10^{-1}$ $b_{f22\_13} = 0.2001226941$ $b_{f22\_14} = 0.3742058442$ $b_{f22\_15} = -0.3143480967$ $b_{f22\_16} = -0.3171037791$ $b_{f22\_17} = -0.4870123119 \cdot 10^{-1}$ $b_{f22\_18} = 1.579414918$ $b_{f22\_19} = 0.4169049022$ $b_{f22\_20} = 0.1616304724$ $b_{f22\_21} = -0.5591376022$ $b_{f22\_22} = 0.1588583436$ $b_{f22\_23} = -0.1138600307 \cdot 10^{-1}$ $b_{f22\_24} = 0.8449804752 \cdot 10^{-1}$ $b_{f22\_25} = 0.1858768375$ $b_{f22\_26} = 0.1118429689 \cdot 10^{-1}$ $b_{f22\_27} = -0.6379647016 \cdot 10^{-1}$ $b_{f22\_28} = -0.5063329143$ $b_{f22\_29} = 1.055097368$ $b_{f22\_30} = 0.7212026863$ $b_{f22\_31} = 0.9485047359$ $b_{f22\_32} = -1.836978186$ $b_{f22\_33} = 0.2149239458$ $b_{f22\_34} = -0.7685986711$ $b_{f22\_35} = 2.571255242$ By using the lower-order model expressions and higher-order model expressions in this way, suitable design parameter values are calculated in the following processing.

Figure 2:
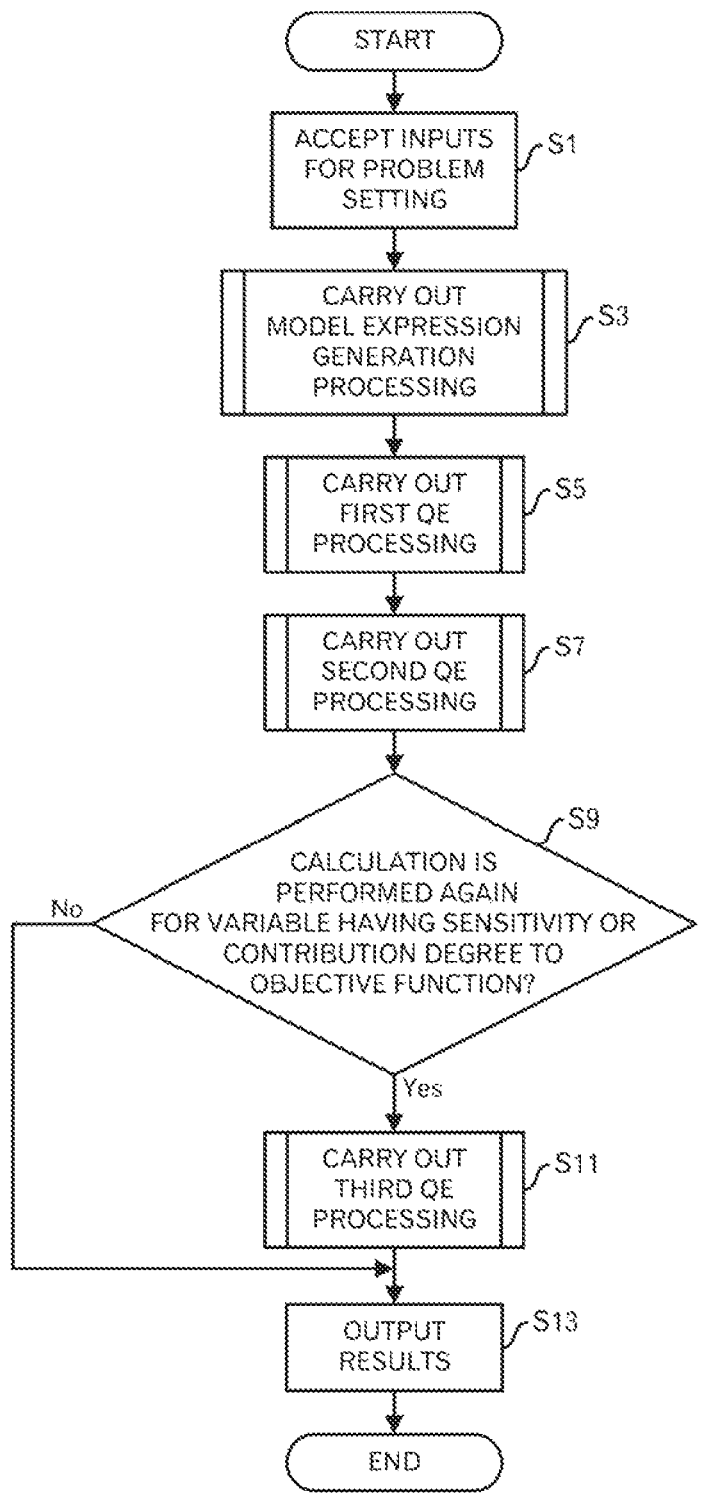
FIG. 2 is a diagram depicting a processing flow relating to an embodiment of the present technique.

Returning to the explanation of the processing in FIG. 2, the first QE processing unit 5 carries out a first QE processing using the data stored in the problem setting data storage unit 2 and model expression data storage unit 4 by operating together with the QE tool 300, and stores the processing results into the processing result storage unit 8 (step S5). This first QE processing will be explained using FIG. 8 to FIG. 11.

The first QE processing is a preprocessing for reducing the number of design parameters to be considered by solving the lower-order model expressions with QE, since the higher-order model expressions cannot be solved at high speed at first with QE. The accuracy is low when lower-order model expressions are used, however, it is possible to obtain approximate design parameter values.

In case of solving problems that the design parameter values are often upper limit values or lower limit values, when calculating the design parameter values using lower-order model expressions having low accuracy to judge that the values are upper limit values or lower limit values, the design parameter values are similarly upper limit values or lower limit values for those design parameters even when calculating the design parameters using the higher-order model expressions. Therefore, for the design parameters that are judged as being upper limit values or lower limit values by the lower-order model expressions, there is no problem to treat those parameters as constants in the higher-order model expressions, and thus it is possible to reduce the number of parameters to be considered.

The first QE processing unit 5 generates the QE problem using constraints and the objective function that are stored in the problem setting data storage unit 2 and the lower-order model expressions stored in the model expression data storage unit 4, and stores the results into a storage device such as a main memory (step S31).

Generally, when generating a QE problem from an optimization problem with constraints as depicted in FIG. 9A, a following processing is carried out. In other words, "∃", which indicates existence, is attached to the variables (design parameters in this embodiment) included in the objective function (−x−2y−5z) (see A in FIG. 9B). Furthermore, in order to indicate the maximization of the objective function, the variable "s" is introduced, for example, to convert the objective function to a relational expression "s objective function" (see B of FIG. 9B), and all of the constraints (condition following "Subject to") are coupled to this relational expression by "^", which indicates AND, (see C of FIG. 9B). In other words, the problem is converted to a problem of finding an "s" that satisfies the condition "s≧−x−2y−5z^2x+3y+z=7^x+y≧1^x≧0^y≧0^z≧0". Thus, the problem becomes a problem of solving for s, or in other words, finding the feasible region for the objective function "−x−2y−5z". Incidentally, when solving the QE problem in FIG. 9B using the QE tool 300, "2s+7≦0" is obtained. The maximum value within this feasible region is used as the optimum solution.

Figure 11:
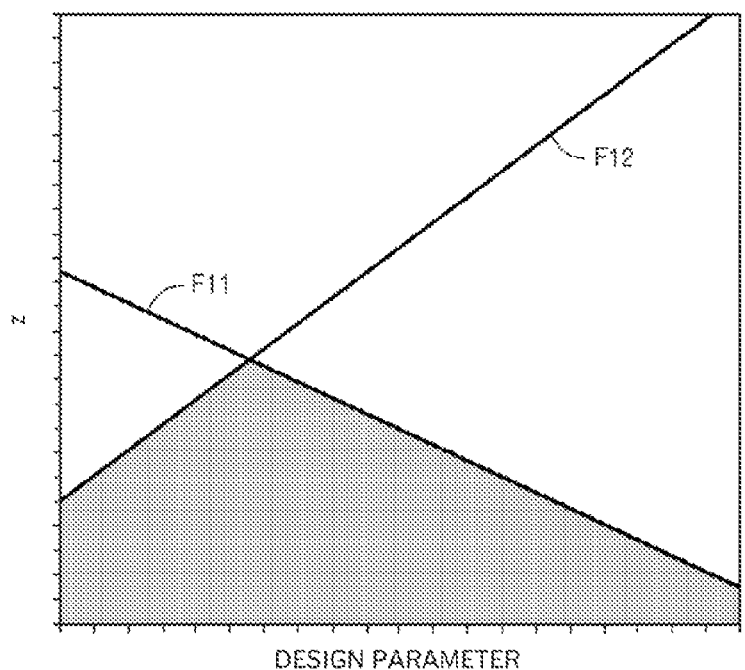
FIG. 11 is a diagram depicting an example of the feasible region.

The example of expressions F11 and F12 that are expressed by the aforementioned seven design parameters $x_1$ to $x_7$ is understood as being an optimization problem with constraints as depicted in FIG. 10. Here, the portion of which neither SNM nor WM is bad is found for the objective function min (F11, F12). However, since it is not typically possible to directly express the "min", a new variable z is employed. Then, by changing the form to "z≦F11^z≦F12", z is a variable that does not become greater than either F11 or F12. In other words, the expression has the same meaning as "z≦min (F11, F12)". More specifically, as depicted in FIG. 11 (the vertical axis represents "z" and the horizontal axis represents a value of one design parameter), the portion equal to or less than the value of the straight line F11 in the range where the value of the straight line F11 is less than the value of the straight line F12, and the portion equal to or less than the value of the straight line F12 in the range where the value of the straight line F12 is less than the value of the straight line F11 become the feasible region.

Therefore, at the step S31, a following QE problem is generated.

$\exists x_1 \exists x_2 \exists x_3 \exists x_4 \exists x_5 \exists x_6 \exists x_7$
  $(0 \leq x_1 \leq 1^\wedge 0 \leq x_2 \leq 1^\wedge 0 \leq x_3 \leq 1^\wedge 0 \leq x_4 \leq 1^\wedge 0 \leq x_5 \leq 1^\wedge 0 \leq x_6 \leq 1^\wedge 0 \leq x_7 \leq 1^\wedge z \leq F11^\wedge z \leq F12)$ Then, the first QE processing unit 5 requests the QE tool 300 to solve the QE problem generated at the step S31, acquires the optimum solution for the objective function from the QE tool 300 and stores the result into the processing result storage unit 8 (step S33). Details of the processing by the QE tool 300 are well known as the qualifier elimination method, so an explanation is omitted here. Explanation of a specific example of the processing is given in the appendix.

In the case of the aforementioned QE problem, a following result is obtained.

1274223392000000000*z−
    10521725891745634157≦0

Thus, the feasible region for the variable z is identified. When the feasible region for the variable z is obtained, the maximum value for the variable z can be obtained. The maximum value of this variable z is identified as the optimum solution for the objective function. In the example above, z=10521725891745634157/1274223392000000000.

Therefore, the first QE processing unit 5 generates a QE problem for finding the design parameter value that realizes the optimum solution of the objective function, requests the QE tool 300 to solve that QE problem, acquires the design parameter value from the QE tool 300 and stores the result into the processing result storage unit 8 (step S35).

More specifically, the first QE processing unit 5 carries out a following procedure.

1) Generate a QE problem from which $x_7$ is removed, and calculate the value for $x_7$.

$\exists x_1 \exists x_2 \exists x_3 \exists x_4 \exists x_5 \exists x_6 \exists z$
  $(0 \leq x_1 \leq 1^\wedge 0 \leq x_2 \leq 1^\wedge 0 \leq x_3 \leq 1^\wedge 0 \leq x_4 \leq 1^\wedge 0 \leq x_5 \leq 1^\wedge 0 \leq x_6 \leq 1^\wedge$
  $0 \leq x_7 \leq 1^\wedge z \leq F11^\wedge z \leq F12^\wedge 1274223392000000000*z−$
  $10521725891745634157=0)$ 2) Reflect the result for $x_7$ on the constraints, then generate a QE problem from which $x_6$ is removed, and calculate the value for $x_6$.

$\exists x_1 \exists x_2 \exists x_3 \exists x_4 \exists x_5 \exists x_7 \exists z$
  $(0 \leq x_1 \leq 1^\wedge 0 \leq x_2 \leq 1^\wedge 0 \leq x_3 \leq 1^\wedge 0 \leq x_4 \leq 1^\wedge 0 \leq x_5 \leq 1^\wedge 0 \leq x_6 \leq$
  $1^\wedge x_7 = 1^\wedge z \leq F11^\wedge z \leq F12^\wedge 1274223392000000000*z−$
  $10521725891745634157=0)$ 3) Reflect the results for $x_6$ and $x_7$ on the constraints, then generate a QE problem from which $x_5$ is removed, and calculate the value for $x_5$.

$\exists x_1 \exists x_2 \exists x_3 \exists x_4 \exists x_6 \exists x_7 \exists z$
  $(0 \leq x_1 \leq 1^\wedge 0 \leq x_2 \leq 1^\wedge 0 x \leq x_3 \leq 1^\wedge 0 \leq x_4 \leq 1^\wedge \leq x_5 \leq 1^\wedge x_6 = 1^\wedge x_7 =$
  $1^\wedge z \leq F11^\wedge z \leq F12^\wedge 1274223392000000000*z−$
  $10521725891745634157=0)$ 4) Reflect the results for $x_5$, $x_6$ and $x_7$ on the constraints, then generate a QE problem from which $x_4$ is removed, and calculate the value for $x_4$.

$\exists x_1 \exists x_2 \exists x_3 \exists x_5 \exists x_6 \exists x_7 \exists z$
  $(0 \leq x_1 \leq 1^\wedge 0 \leq x_2 \leq 1^\wedge 0 \leq x_3 \leq 1^\wedge 0 \leq x_4 \leq 1^\wedge x_5 = 1^\wedge x_6 = 1^\wedge x_7 =$
  $1^\wedge z \leq F12^\wedge 1274223392000000000*z−$
  $10521725891745634157=0)$ 5) Reflect the results for $x_4$, $x_5$, $x_6$ and $x_7$ on the constraints, then generate a QE problem from which $x_3$ is removed, and calculate the value for $x_3$.

$\exists x_1 \exists x_2 \exists x_4 \exists x_5 \exists x_6 \exists x_7 \exists z$
  $(0 \leq x_1 \leq 1^\wedge 0 \leq x_2 \leq 1^\wedge 0 \leq x_3 \leq 1^\wedge x_4 = 1^\wedge x_5 = 1^\wedge x_6 = 1^\wedge x_7 =$
  $1^\wedge z \leq F11^\wedge z \leq F12^\wedge 1274223392000000000*z−$
  $10521725891745634157=0)$ 6) Reflect the results for $x_3$, $x_4$, $x_5$, $x_6$ and $x_7$ on the constraints, then generate a QE problem from which $x_2$ is removed, and calculate the value for $x_2$.

$\exists x_1 \exists x_2 \exists x_3 \exists x_4 \exists x_5 \exists x_6 \exists x_7 \exists z$
  $(0 \leq x_1 \leq 1^\wedge 0 \leq x_2 \leq 1^\wedge x_3 = 1^\wedge x_4 = 1^\wedge x_5 = 1^\wedge x_6 = 1^\wedge x_7 = ^\wedge z \leq F$
  $11^\wedge z \leq F12^\wedge 1274223392000000000*z−$
  $10521725891745634157=0)$ 7) Reflect the results for $x_2$, $x_3$, $x_4$, $x_5$, $x_6$ and $x_7$ on the constraints, then generate a QE problem from which $x_1$ is removed, and calculate the value for $x_1$.

$\exists x_2 \exists x_3 \exists x_4 \exists x_5 \exists x_6 \exists x_7 \exists z$
  $(0 \leq x_1 \leq 1^\wedge x_2 = 1^\wedge x_3 = 1^\wedge x_4 = 1^\wedge x_5 = 1^\wedge x_6 = 1^\wedge x_7 = 1^\wedge z \leq F$
  $11^\wedge z \leq F12^\wedge 1274223392000000000*z−$
  $10521725891745634157=0)$ In this way, the maximum value of the feasible region for the variable z that was obtained at the step S33, as an additional constraint, is further coupled by AND to the constraints of the QE problem generated at the step S31. Moreover, the symbol "∃", which indicates existence, is attached to the variable z and arranged in the same way as the other design parameters. In other words, the problem becomes a problem to find values of the design parameters $x_1$ to $x_7$ and variable z, which satisfy the following constraints.

$0 \leq x_1 \leq 1^\wedge 0 \leq x_2 \leq 1^\wedge 0 \leq x_3 \leq 1^\wedge 0 \leq x_4 \leq 1^\wedge 0 \leq x_5 \leq 1^\wedge 0 \leq x_6 \leq$
  $1^\wedge 0 \leq x_7 \leq 1^\wedge z \leq F11^\wedge z \leq F12^\wedge 1274223392000000000*z−$
  $10521725891745634157=0$ The variable z has already been found, so that the value is output as it is.

Then, the QE tool 300 solves the QE problem by the well-known qualifier elimination method, and outputs design parameter values that satisfy the aforementioned constraints.

In the aforementioned example, following results are obtained.

$x_1 = 7013720457/14016457312 = 0.5003918$,
$x_2 = 1$,
$x_3 = 1$,
$x_4 = 1$,
$x_5 = 1$,
$x_6 = 1$,
$x_7 = 1$,
$z = 10521725891745634157/1274223392000000000$

Thus, the values of the design parameters included in lower-order model expressions are obtained in this way. As was described above, it can be understood that many design parameter values are upper limit values. However, depending on the contents of F11 and F12, the design parameter values may be lower limit values, so which design parameter values will become upper limit values or lower limit values is confirmed in the first QE processing.

Figure 8:
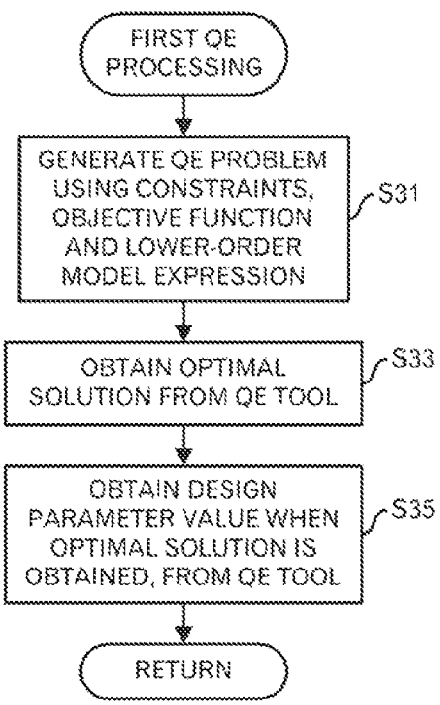
FIG. 8 is a diagram depicting a processing flow of a first QE processing.

Returning from the explanation of the processing in FIG. 8 to the explanation of the processing in FIG. 2, the second QE processing unit 6 carries out a second QE processing using the data stored in the processing result storage unit 8, problem setting data storage unit 2 and model expression data storage unit 4, and stores the processing result into the processing result storage unit 8 (step S7). This second QE processing will be explained using FIG. 12 and FIG. 13.

For the design parameters whose design parameter values are upper limit values or lower limit values among the design parameters, which are stored in the processing result storage unit 8 and obtained in the first QE processing, the second QE processing unit 6 substitutes the obtained upper limit values or lower limit values for the higher-order model expressions stored in the model expression data storage unit 4 to transform the higher-order model expressions, and then stores the results into the storage device such as the main memory (step S41).

In the example described above, the values of the parameters other than $x_1$, namely, parameters $x_2$ to $x_7$, are the upper limit value "1". Therefore, the value "1" is substituted for $x_2$ to $x_7$ in the higher-order model expressions F21 and F22. Then, following simplified expressions are obtained.

$$F21b = 8.500756371 - 0.8407133034 * x_1 + 0.1922736364 * x_1^2$$

$$F22b = 7.953391257 + 1.351922165 * x_1 + 0.3143480967 * x_1^2$$

Then, the second QE processing unit 6 generates a QE problem using the transformed higher-order model expressions, and the constraints and objective function that are stored in the problem setting data storage unit 2, and stores the results into the storage device such as a main memory (step S43).

At the step S43, basically the same processing as was performed at the step S31 is performed. However, min (F21b, F22b) is the objective function. Moreover, because only the design parameter $x_1$ whose value is not an upper limit value or lower limit value is used, only the constraint for $x_1$ is selected. In addition, only $x_1$ is also the design parameter to be solved. Therefore, the QE problem that is generated at the step S43 is as follows:

$$\exists x_1 (0 \leq x_1 \leq 1 \hat{} z \leq F21b \hat{} z \leq F22b)$$

After that, the second QE processing unit 6 requests the QE tool 300 to solve the QE problem generated at the step S43, acquires the optimum solution for the objective function from the QE tool 300 and stores the result into the processing result storage unit 8 (step S45).

At the step S45, basically the same processing as that at the step S33 is carried out. Then, the value of the variable z is obtained as follows:

A or (B and (C or D)) or (E and F and (G or H))

A: $31250000 * z - 245384897 \leq 0$

B: $1000000000 * z - 8500756371 \leq 0$

C: $128332790224623817805000000000000000000 * z^2 - 2123777303605799784226237172474000000000 * z + 8786555312333199480285726829488156804693 \leq 0$ D: $4870500145120362242000000000 * z - 40299986246784283912502515373 \leq 0$ E: $10000000000 * z - 89909653253 \leq 0$ F: $1000000000 * z - 7953391257 \leq 0$ G: $128332790224623817805000000000000000000 * z^2 - 2123777303605799784226237172474000000000 * z + 8786555312333199480285726829488156804693 \leq 0$ H: $28955559553970980140000000 * z - 239595923394566201086579432 \leq 0$ This is further arranged to obtain the expression for variable z as follows:

$$238618787270928516302097379198561373969109372528 * z^2 - 3948898513981\\ 542665325272158255992498641993331585 * z + 16337501656366999893287576\\ 82651873596521592768350666 \leq 0 \text{ or}$$

$$610931112112851333073202088724641855671392 * z - 50551446270413825431\\ 1579799314432635828595 \leq 0$$

Finally, the feasible region for the variable range z is $z \leq 8.29074$ .... Therefore, the maximum value of the variable z is $8.29074$ .... In the present application, a number beyond the decimal point is represented by using a form that includes "..." because of the convenience of the notation. However, actually a form that includes the square root √ is output.

Furthermore, the second QE processing unit 6 generates a QE problem to calculate the design parameter values for realizing the optimal solution of the objective function, requests the QE tool 300 to solve that QE problem, acquires the design parameter values from the QE tool 300 and stores the results into the processing result storage unit 8 (step S47).

In the example described above, a following QE problem is generated.

$$\exists x_1 \exists z\\
(0 \leq x_1 \leq 1 \hat{} z \leq F21b \hat{} z \leq F22b \hat{} 238618787270928516302097379\\
19856137396910937528 * z^2 - 3948898513981\\
542665325272158255992498641993331585 * z +\\
16337501656366999893287576\\
82651873596521592768350666 = 0 \text{ or}$$

$$610931112112851333073202088724641855671392 * z - 505514\\
46270413825431\ 1579799314432635828595 > 0)$$

Incidentally, in this expression as well, for convenience of notation, approximate values are used.

Therefore, the problem is a problem to calculate the value of the design parameter $x_1$ and the value of the variable z that satisfy the constraints "$0 \leq x_1 \leq 1 \hat{} z \times F21b \hat{} z \leq F22b \hat{} z = 8.2904$". Incidentally, the value of the variable z has already been calculated. Therefore, the value of the variable z is output as it is.

The QE tool 300 solves the QE problem using a well-known qualifier elimination method, and outputs design parameter values that satisfies the constraints described above.

In the example above, following results are obtained.

14736906286567327868148989735429917223088831021295140575344854968 7*$x_1^4$−
126758523188082101149065533665661229995346 3686527769426803 057971300*$x_1^3$+
30268321641872296056770189357404233369488966240447508132527764899 60*$x_1^2$−
12948149542330255892359902889538476350540379 25349792811665028977000*$x_1$+
15337467252552773114496394074533904677 648627615460838337582733 6700≧0 and 13783646935592814416188923068045742305401334162815 42229700689209 2*$x_1^4$−
120537537699802114369719508264578 6689747806 60368045992938616 6019204*$x_1^3$+
29596491746153206446303671750720090197775572156451666 5233454151547*$x_1^2$−
1418465124568837978619951807697612 4834681503148 2078133627654338810*$x_1$+
189893838583810459858497542338049053807297 7699613558147731059 7575≧0 and 18354054143099064528526898904869113730948214225 42*$x_1^2$−80252798970 9735934095414690667927417914886431 9177*$x_1$+21 598736952195890231573 0737425281501605293653975 5≧0 and 545582478146275943640962608991635504887081954057*$x_1^2$−234639577202 68855071916462252021020067394984671 50*$x_1$+557 302446970863503723288 521839833928729371673 530≦0 and $x_1$−1≦0 and $x_1$≧0

When further arranging this, the feasible region for the design parameter $x_1$ is obtained as follows:

$x_1$−1<0 and

184630436769134077176252*$x_1^2$− 79907200518177501787675 5*$x_1$+19947873 0104451626416796=0

From this result, "$x_1$=0.2659847156 . . . " that gives the maximum value is obtained.

Figure 13:
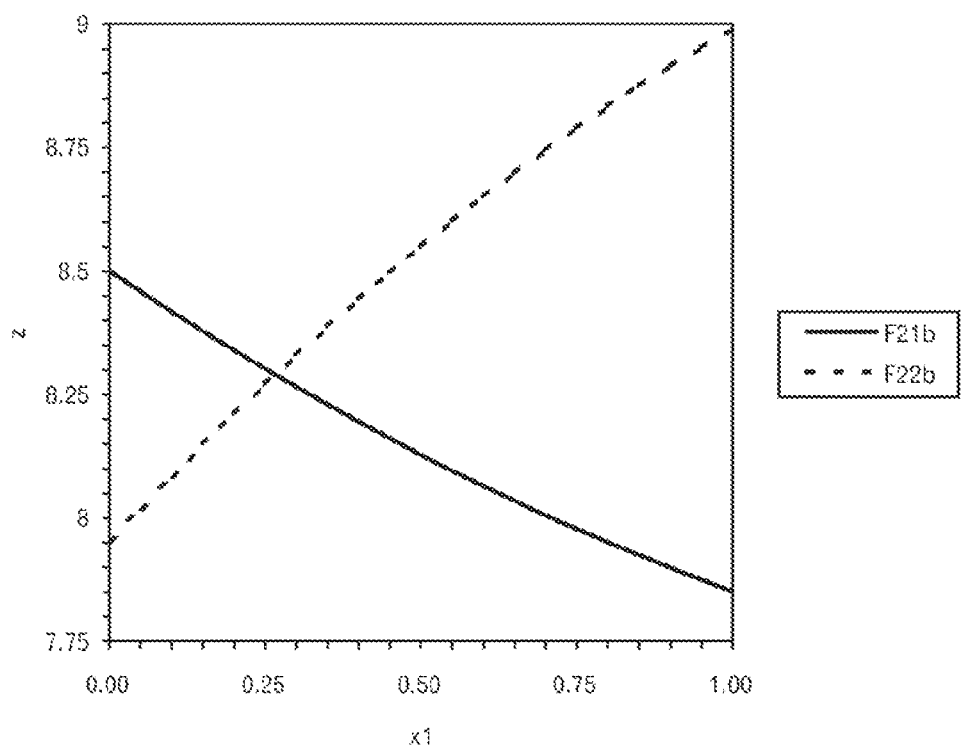
FIG. 13 is a diagram schematically depicting a relationship between design parameter x1 and the model expression.
Figure 12:
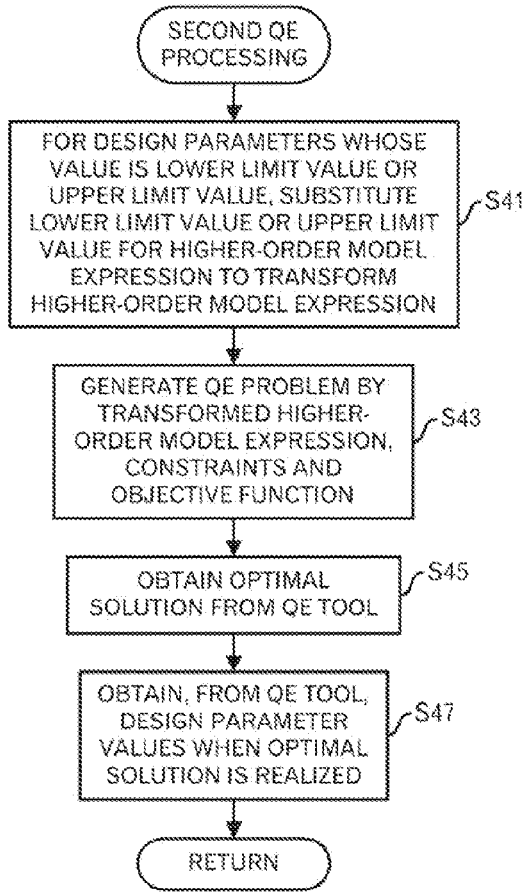
FIG. 12 is a diagram depicting a processing flow of a second QE processing.

When depicting the expressions F21b and F22b, a graph in FIG. 13 is obtained. That is, the x-axis represents the design parameter $x_1$, and the y-axis represents the variable z. From this graph, it can be seen that the optimum value of the variable z is "z=8.29074 . . . " at the point where the curves F21b and F22b cross, and the value of the design parameter $x_1$ at that point is "0.2659847156 . . . ".

Thus, a value in the second QE processing is obtained that differs from the value of the design parameter $x_1$ obtained in the first QE processing. In other words, by carrying out the second QE processing, a value having little error can be obtained for the design parameter $x_1$.

Returning to the explanation of the processing flow depicted in FIG. 2, the third QE processing unit 7, for example, determines whether or not calculation is carried out again for variables having high sensitivity or a high contribution degree to the objective function (step S9). For example, the third QE processing unit 7 determines whether or not there is an instruction from the designer, or whether or not the third QE processing unit 7 is set as a setting to the optimization processing apparatus 100 to perform the processing.

In the case where calculation is not carried out again for the variables having high sensitivity or a high contribution degree to the objective function, a processing advances to the step S13.

On the other hand, in the case where calculation is to be carried out again for variables having high sensitivity or a high contribution degree to the objective function, the third QE processing unit 7 carries out the third QE processing using data stored in the processing result storage unit 8, problem setting data storage unit 2 and model expression data storage unit 4, and stores the processing result into the processing result storage unit 8 (step S11). The third QE processing will be explained using FIG. 14.

By using advantage of the characteristic that a lot of design parameter values become upper limit values or lower limit values, the number of design parameters is reduced by adopting the upper limit values or lower limit values of the design parameters that were obtained in the first QE processing as they are. However, in the first QE processing, the QE processing is carried out using a lower-order model expression. Therefore, there is a possibility that $x_7$=0.95, for example, is obtained, when calculation with high accuracy is carried out, however, the upper limit "1" was calculated due to the error. Therefore, confirmation is performed in the third QE processing for the design parameters, which largely influences the objective function.

Incidentally, sensitivity or the contribution degree to the objective function represents an influence degree to the objective function when the values of the design parameters are changed. For example, when the absolute value of a coefficient in the objective function is large, it can be judged that the influence degree is high, and the sensitivity or contribution degree is high.

First, the third QE processing unit 7 identifies the design parameters having high sensitivity or a high contribution degree from among the design parameters whose values were found to be upper limit or lower limit values in the lower-order model expression stored in the model expression data storage unit 4 (step S51).

For example, in F11 and F12, the coefficient whose absolute value is the greatest is the coefficient of $x_7$. Therefore, $x_7$ is identified. Plural design parameters can be identified. However, because, in such a case, plural higher-order terms remain in the higher-order model expression, the processing time for the QE processing becomes long. Here, only one parameter is selected.

Next, for the design parameters other than the design parameters identified at the step S51 and the design parameters for which neither upper limit values nor lower limit values were obtained in the first QE processing, the third QE processing unit 7 substitutes values, which are stored in the processing result storage unit 8 and were obtained in the first QE processing, for the higher-order model expression stored in the model expression data storage unit 4, to transform the higher-order model expression, and then stores the transformed higher-order model expression into the storage device such as a main memory (step S53).

In the example above, because the upper limit "1" is substituted for the design parameters $x_2$ to $x_6$, transformed higher-order model expressions is obtained as follows:

$F21c$=−2.464051045*$x_7$+10.92366518− 0.7848741460*$x_1$+0.1922736364*$x_1^2$+ 0.4114223556*$10^{-1}$*$x_7^2$−0.5583915742* $10^{-1}$*$x_7$*$x_1$ $F22c$=4.739436358*$x_7$+3.052324427+ 1.279031039*$x_1$−0.3143480967*$x_1^2$+ 0.1616304724*$x_7^2$+0.7289112590*$10^{-1}$*$x_7$*$x_1$

The third QE processing unit 7 generates a QE problem using the transformed higher-order model expressions and the constraints and objective function that are stored in the problem setting data storage unit 2, and stores the result into the storage device such as a main memory (step S55).

At the step S55, basically the same processing as that at the step S31 is carried out. However, min (F21$c$, F22$c$) is the objective function. In addition, because the design parameters are just $x_1$ and $x_7$ whose values are not upper limit values or lower limit values, only the constraints for $x_1$ and $x_7$ are selected. Moreover, the design parameters to be solved are also only $x_1$ and $x_7$. Therefore, the QE problem generated at the step S55 is as follows:

$$\exists x_1 \exists x_7 (0 \leq x_1 \leq 1 \char`\^ 0 \leq x_7 \leq 1 \char`\^ z \leq F21c \char`\^ z \leq F22c)$$

After that, the third QE processing unit 7 requests the QE tool 300 to solve the QE problem generated at the step S55, acquires the optimum solution for the objective function from the QE tool 300, and stores the result into the processing result storage unit 8 (step S57).

At the step S57, basically the same processing as that at the step S33 is carried out. Then, the value of the variable z is obtained as follows:

765216926283716042000946658880890312135703487757199979083811494341308944978388046453451222807272324990005504400*$z^2$−12663562744025352857336135629925288094283357130144812271996284880889206265159454784646176290112631818545299010496*$z$+523920725417032946379957389249471876628532901339938229350129658039715949961773774554380184775912388099111636594 5≤0 and 46344363574778596742547279721818107732363291607587954923873947449929077429329873040 0*$z$−38347606789838260413958490393512952080126186216402745648600573893865907279458787 23723<0

Finally, the feasible region for the variable z becomes $z \leq 8.290742434\ldots$. Therefore, the maximum value of the variable z becomes $z = 8.290742434\ldots$. This is almost the same value as the value calculated by the second QE processing unit 6.

Furthermore, the third QE processing unit 7 generates a QE problem to calculate the design parameter values for realizing the optimum solution for the objective function, requests the QE tool 300 to solve the QE problem, acquires the design parameter values from the QE tool 300 and stores the results into the processing result storage unit 8 (step S59).

At the step S59, basically the processing is the same as that at the step S35. Thus, in the aforementioned example, a following QE problem is generated.

$$\exists x_1 \exists x_7 \exists z$$
$$(0 \leq x_1 \leq 1 \char`\^ 0 \leq x_7 \leq 1 \char`\^ z \leq F21c \char`\^ Z \leq F22c \char`\^ z = 8.290742434)$$

Therefore, the problem is a problem to calculate the values of the design parameters $x_1$ and $x_7$ and the value of the variable z, which satisfy the following constraints.

$$0 \leq x_1 \leq 1 \char`\^ 0 \leq x_7 \leq 1 \char`\^ z \leq F21c \char`\^ z \leq F22c \char`\^ z = 8.290742434$$

Incidentally, the value of the variable z is already known. Therefore, the value of the variable z is output as it is.

The QE tool 300 solves the QE problem using the well-known qualifier elimination method, and outputs the design parameter values that satisfy the aforementioned constraints.

In the example above, the following results are obtained.

$$x_1 = 0.2659847199,$$

$$x_7 = 0.9999999988$$

Thus, values that are almost the same as the values calculated by the second QE processing unit 6 are obtained. In this example, nearly the same result is obtained, however, this is not always the case. Therefore, it is possible for the designer to determine which value is to be used, by comparing the processing results from the second QE processing unit 6 with the processing results from the third QE processing unit 7.

Returning to the explanation of the processing in FIG. 2, the output unit 9 outputs the optimum value of the objective function and the design parameter values, which are stored in the processing result storage unit 8 to an output device (for example, a printer or display device, and in some cases, to another computer connected to a network, or to a program that is executed on the same computer or another computer) (step S13). By doing so, the designer is able to acquire the design parameter values to be employed. In the case that the third QE processing is performed, the optimum value of the objective function and the design parameter values obtained in the second QE processing, and the optimum value of the objective functions and the design parameters obtained in the third QE processing are outputted. From this, the designer can determine the validity of the processing results from the first QE processing.

Although the embodiment is explained above, this technique is not limited to this embodiment. For example, the functional block diagram depicted in FIG. 1 is a mere example, and does not always correspond to an actual program module configuration.

In addition, the processing flow can be changed so as to change the order of the steps or execute the steps in parallel, as long as the processing results do not change. For example, when the third QE processing is always executed, the second QE processing and third QE processing can be executed in parallel. Furthermore, after outputting the processing results of the second QE processing, the designer may consider the outputs, and then instruct whether or not the third QE processing is carried out.

Incidentally, plural QE tools 300 may be provided. For example, the different QE tools 300 may be used for the lower-order model expressions and for the higher-order model expressions. More specifically, a QE tool, which employs an algorithm "Virtual Substitution", may be applied to the lower-order model expressions, and a QE tool, which employs an algorithm "Cylindrical Algebraic Decomposition (CAD)", may be applied to the higher-order model expression.

In addition, although an example was explained that the optimization processing apparatus is implemented by a stand-alone type computer, the aforementioned processing may be executed by plural computers connected to the computer network and cooperating with each other.

Figure 15:
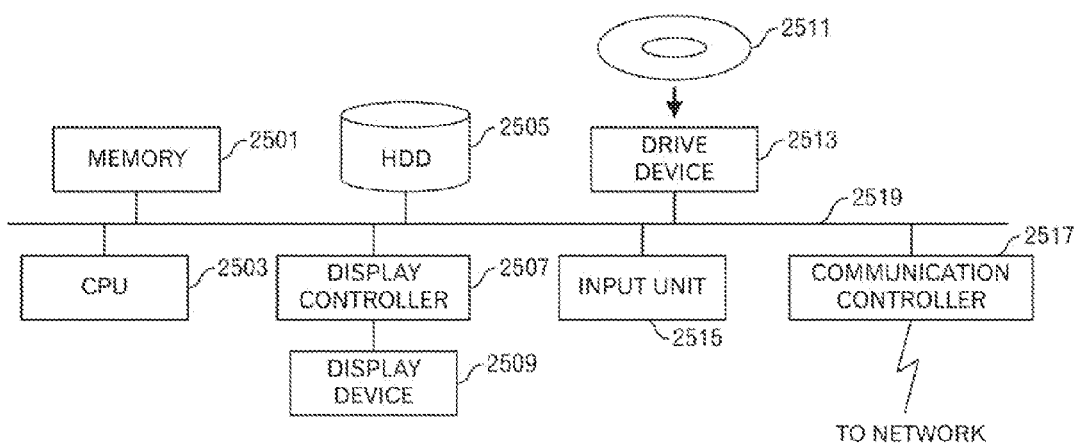
FIG. 15 is a functional block diagram of a computer.
Figure 14:
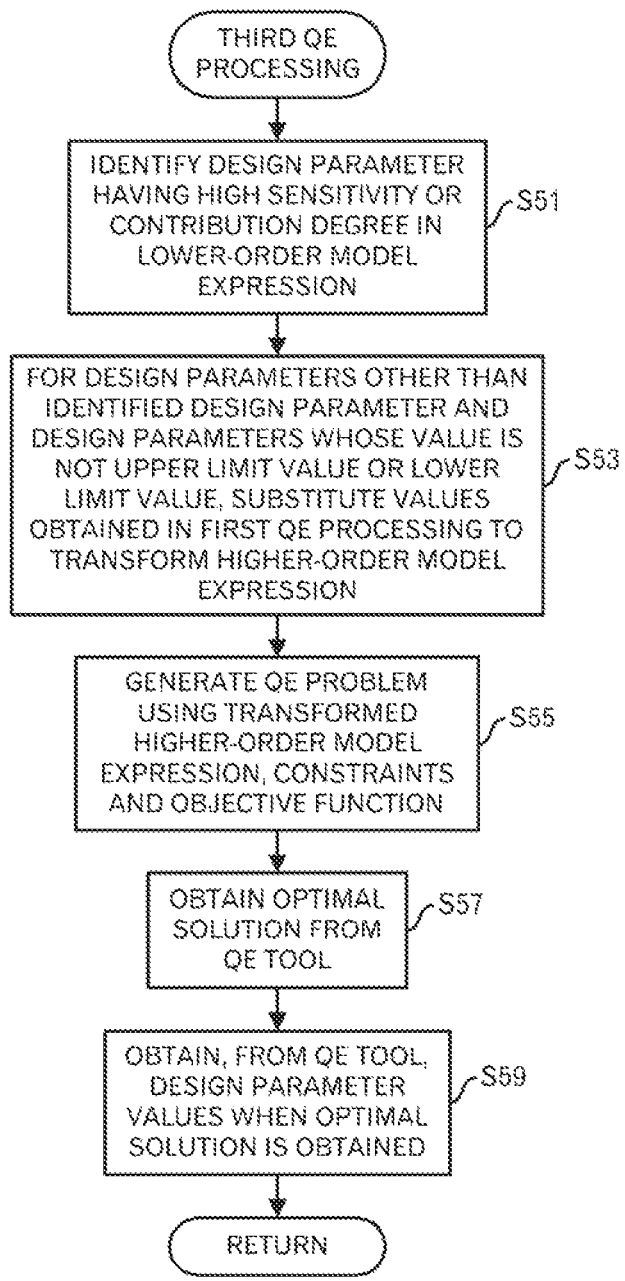
FIG. 14 is a diagramd epicting a processing flow of a third QE processing.

In addition, the aforementioned optimization processing apparatus is a computer device as shown in FIG. 15. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 15. An operating system (OS) and an application program for carrying out the foregoing processing in the embodiment, are stored in the HDD 2505, and when executed by the CPU 2503, they are readout from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

APPENDIX

Specific Example of a Method for Calculating the Feasible Region

In the following, a specific example of a calculation processing of the feasible region, which is carried out by the QE tool 300, will be explained.

First, it is assumed that the input variables are X and Y, the output variable is Z, the model expression representing the relation between the input and the output is represented by "$Z=X^2+Y^2-1$". Furthermore, it is assumed that the constraints are represented by "$Z<0$ AND $X^3-Y^2=0$".

(1) Calculation step 1
(1-1) Set functions F and G as follows:

$$F(X,Y)=X^2+Y^2-1$$

$$G(X,Y)=X^3-Y^2$$

(1-2) Calculate a discriminant $(F, Y)=-4x^2+4=0$.

$$X=-1,1$$

(1-3) Calculate a discriminant $(G, Y)=4x^3=0$.

$$X=0$$

(1-4) Calculate a resultant $(F, G, Y)=(x^3+x^2-1)=0$.
It is assumed that a value of X, which satisfies this expression, is A.

$$X=A$$

(2) Calculation step 2
(2-1) Put values of X, which were calculated in the calculation step 1 in order $$X=\{-1,0,A,1\}$$

(2-2) Add a value less than the minimum value of X, values between calculated values of X and a value greater than the maximum value.

$$X=\{X1,X2=-1,X3,X4=0,X5,X6=A,X7,X8=1,X9\}$$

(3) Calculation step 3
Calculate Y satisfying a constraint of $F(X, Y)=0$ or $G(X, Y)=0$ for each value of X.

$X=X1$: none $X=X2$: $Y=\{Y21=0\}$ $X=X3$: $Y=\{Y31,Y32\}$ $X=X4$: $Y=\{Y41=-1,Y42=0,Y43=1\}$ $X=X5$: $Y=\{Y51,Y52,Y53,Y54\}$ $X=X6$: $Y=\{Y61=-A^{3/2},Y62=A^{3/2}\}$ $X=X7$: $Y=\{Y71,Y72,Y73,Y74\}$ $X=X8$: $Y=\{Y81=-1,Y82=0,Y83=1\}$ $X=X9$: $Y=\{Y91,Y92\}$ (4) Calculation step 4
Add a value less than the minimum value of Y, values between calculated values of Y and a value greater than the maximum value of Y.
When there is no value, "0" is set.

$X=X1$: $Y=\{YY11=0\}$ $X=X2$: $Y=\{YY21,YY22=Y21,YY23\}$ $X=X3$: $Y=\{YY31,YY32=Y31,YY33,YY34=Y32,YY35\}$ $X=X4$: $Y=\{YY41,YY42=Y41,YY43,YY44=Y42,YY45,YY46=Y43,YY47\}$ $X=X5$: $Y=\{YY51,YY52=Y51,YY53,YY54=Y52,YY55,YY56=Y53,YY57,YY58=Y54,YY59\}$ $X=X6$: $Y=\{YY61,YY62=Y61,YY63,YY64=Y62,YY65\}$ $X=X7$: $Y=\{YY71,YY72=Y71,YY73,YY74=Y72,YY75,YY76=Y73,YY77,YY78=Y74,YY79\}$ $X=X8$: $Y=\{YY81,YY82=Y81,YY83,YY84=Y82,YY85,YY86=Y83,YY87\}$ $X=X9$: $Y=\{YY91,YY92=Y91,YY93,YY94=Y92,YY95\}$ (5) Calculation step 5
(5-1) Calculate signs of $F(X, Y)$ and $G(X, Y)$ for each combination of X and Y, which are calculated at the calculation step 4.

$$(X,Y)=(X1,YY11) \to (F,G)=(+,-)$$

Figure 16:
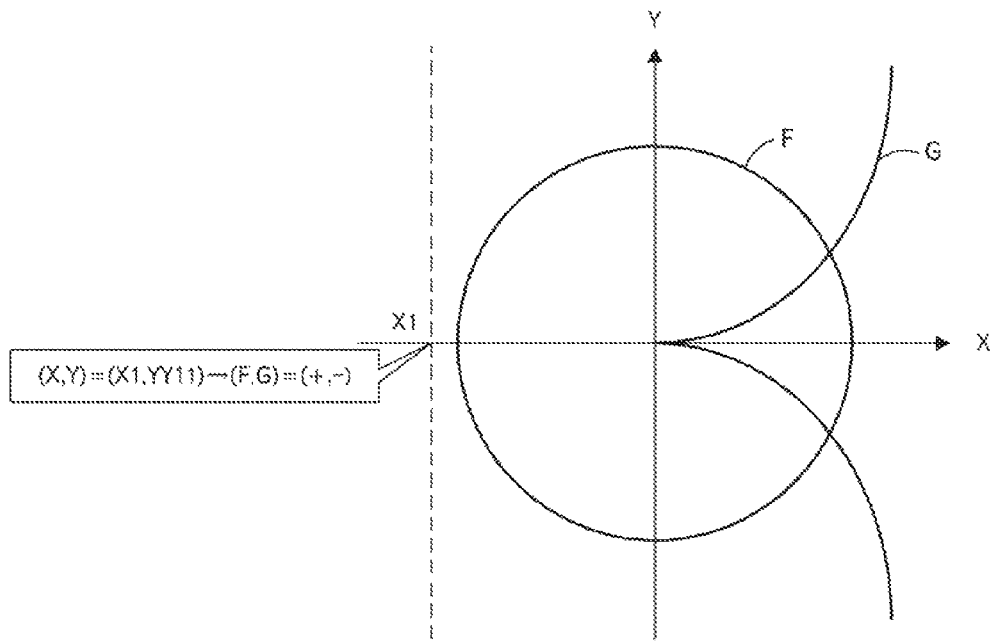
FIG. 16 is a diagram to explain a processing of a QE tool.

Carry out such calculation for all combinations. As depicted in FIG. 16, in a plane XY, $F(X, Y)=0$ represents a circle whose radius is "1" and whose center is the origin, and $G(X, Y)=0$ represents a curve depicted by "G".

X1 is a value less than "−1", and X=X1 represents a straight line represented by a dotted line. Because of YY11=0, a cross point of X=X1 and Y=0 is a point (X1, YY11). According to the definition of F and G, (F, G)=(+, −).

Figure 17:
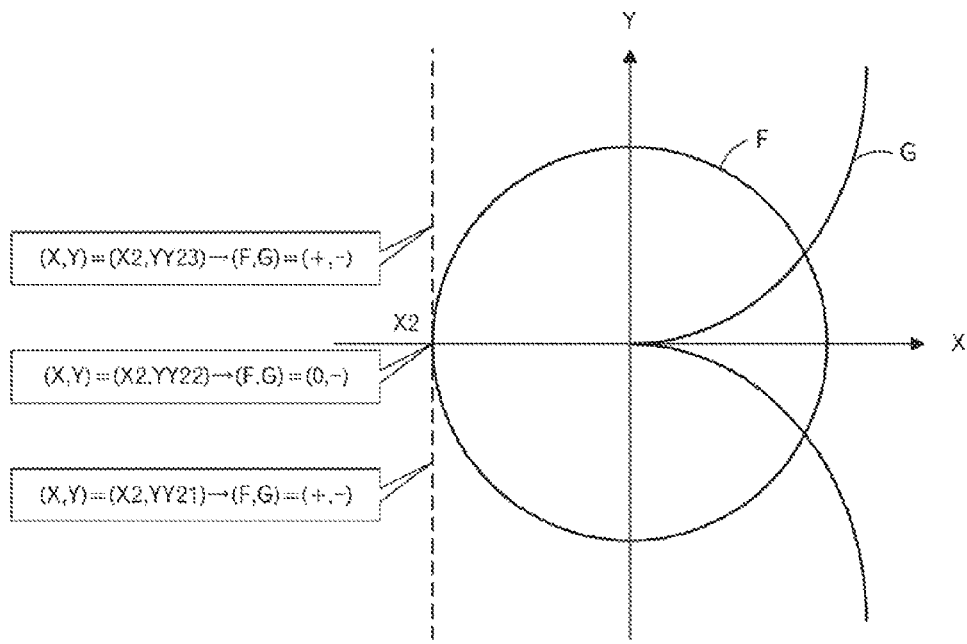
FIG. 17 is a diagram to explain the processing of the QE tool.

Furthermore, FIG. 17 depicts a state at $X=X2=-1$. Because of X2=−1, X=X2 is a straight line, which comes in contact with $F(X, Y)=0$. Then, YY22=0 and YY21 is a positive value. Therefore, YY23 is a negative value.
From this point, following calculation results are obtained.

$$(X,Y)=(X2,YY23) \to (F,G)=(+,-)$$

$$(X,Y)=(X2,YY22) \to (F,G)=(0,-)$$

$$(X,Y)=(X2,YY21) \to (F,G)=(+,-)$$

Figure 18:
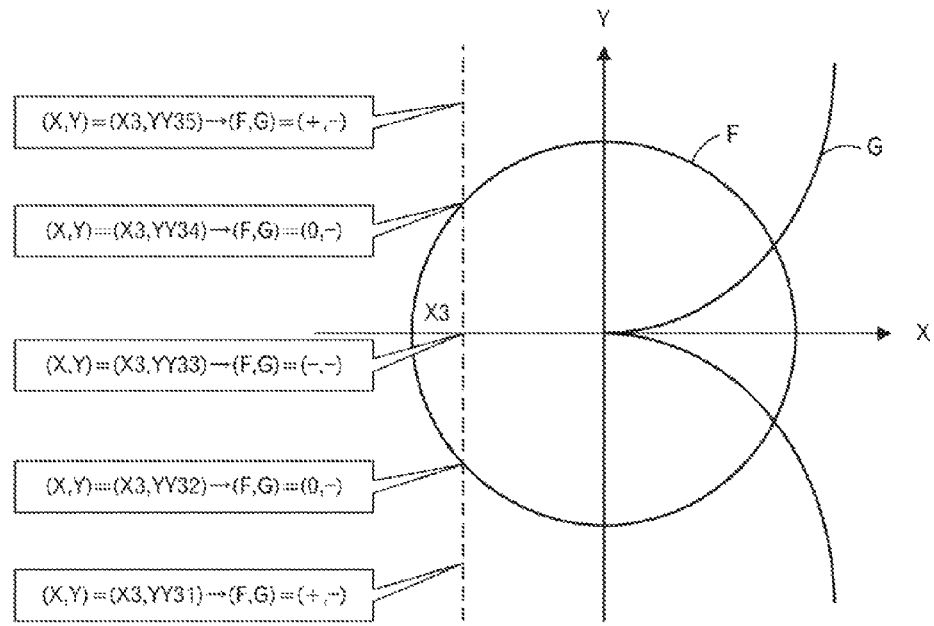
FIG. 18 is a diagram to explain the processing of the QE tool.

In addition, FIG. 18 depicts a state at X=X3. X3 is a value greater than "−1" and less than "0". On the other hand, YY32=Y31 and YY34=Y32. Therefore Y31 and Y32 are points on F (X, Y)=0. In addition, YY33=0 is assumed. Furthermore, because YY35 is a value greater than YY34, YY31 is a value less than YY32. Then, following calculation results are obtained.

$$(X,Y)=(X3,YY35) \to (F,G)=(+,-)$$

Figure 19:
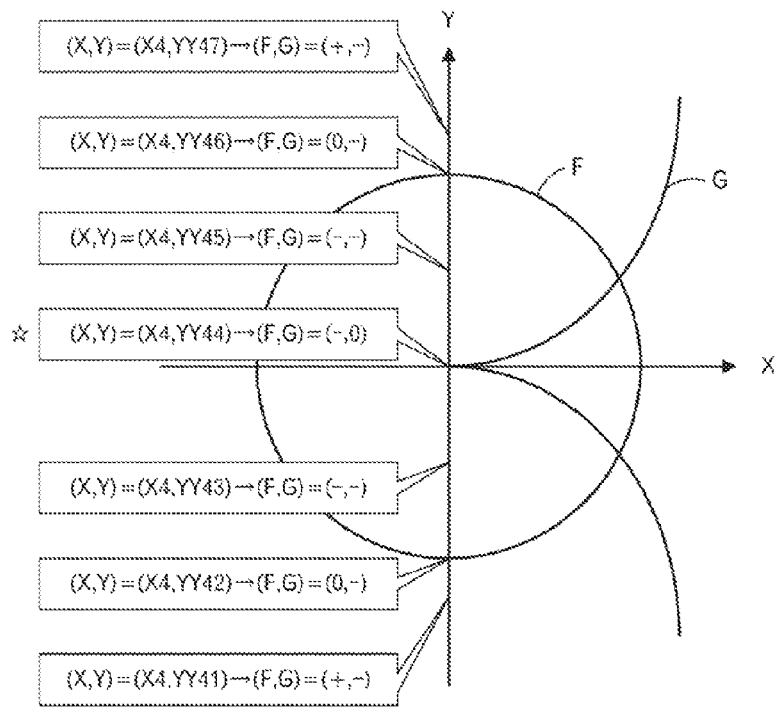
FIG. 19 is a diagram to explain the processing of the QE tool.

$(X,Y)=(X3,YY34) \rightarrow (F,G)=(0,-)$ $(X,Y)=(X3,YY33) \rightarrow (F,G)=(-,-)$ $(X,Y)=(X3,YY32) \rightarrow (F,G)=(0,-)$ $(X,Y)=(X3,YY31) \rightarrow (F,G)=(+,-)$ Furthermore, FIG. 19 depicts a state at X=X4=0. YY42=Y41=−1, YY44=Y42=0 and YY46=Y43=1. Therefore, YY41 is a value less than "−1", YY43 is a value greater than "−1" and less than "0", YY45 is a value greater than "0" and less than "1", and YY47 is a value greater than "1". Then, following calculation results are obtained.

Figure 20:
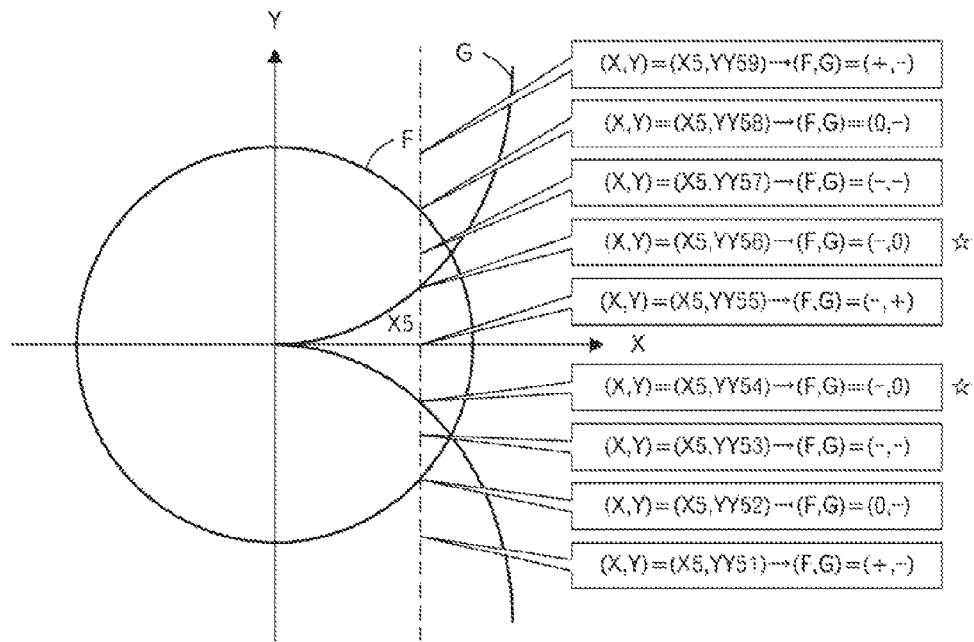
FIG. 20 is a diagram to explain the processing of the QE tool.

$(X,Y)=(X4,YY47) \rightarrow (F,G)=(+,-)$ $(X,Y)=(X4,YY46) \rightarrow (F,G)=(0,-)$ $(X,Y)=(X4,YY45) \rightarrow (F,G)=(-,-)$ $(X,Y)=(X4,YY44) \rightarrow (F,G)=(-,0)$ $(X,Y)=(X4,YY43) \rightarrow (F,G)=(-,-)$ $(X,Y)=(X4,YY42) \rightarrow (F,G)=(0,-)$ $(X,Y)=(X4,YY41) \rightarrow (F,G)=(+,-)$ In addition, FIG. 20 depicts a state at X=X5. X5 is a value greater than "0" and less than A of X, which satisfies "$X^3+X^2-1=0$". Furthermore, Y51, Y52, Y53 and Y54 are values satisfying F(X, Y)=0 or G (X, Y)=0, and YY52=Y51, YY54=Y52, YY56=Y53 and YY58=Y54. Therefore, (X5, YY52) is a point whose Y is a negative value among cross points of F(X, Y)=0 and X=X5. (X5, YY54) is a point whose Y is a negative value among cross points of G (X, Y)=0 and X=X5. (X5, YY56) is a point whose Y is a positive value among cross points of G (X, Y)=0 and X=X5. (X5, YY58) is a point whose Y is a positive value among cross points of F (X, Y)=0 and X=X5. Furthermore, YY55 is a point between YY56 and YY54. However, YY55=0 is assumed, here. Incidentally, YY51 is a value less than YY52, and YY59 is a value greater than YY58. Then, following calculation results are obtained.

Figure 21:
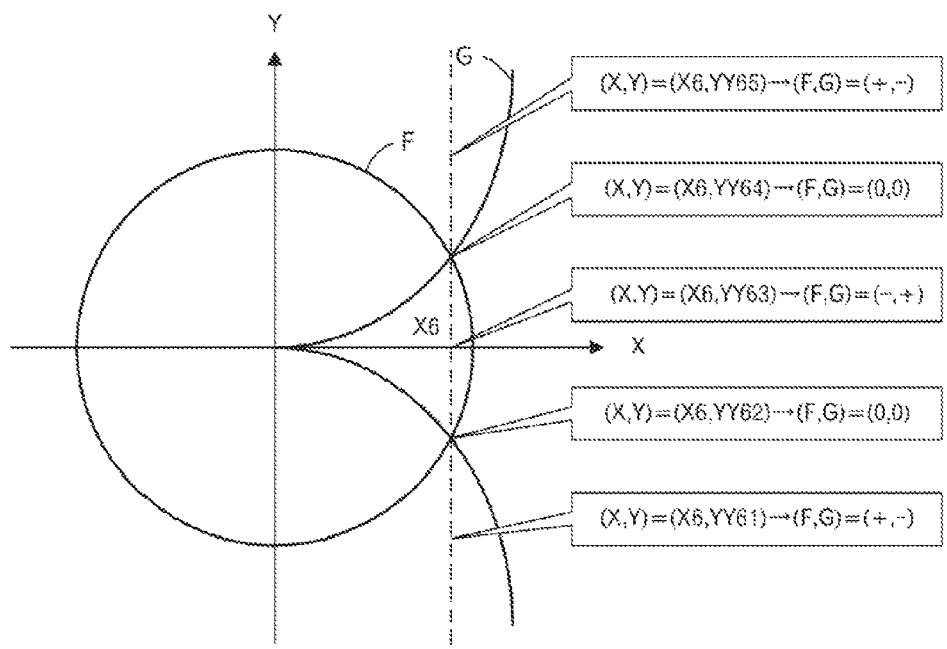
FIG. 21 is a diagram to explain the processing of the QE tool.

$(X,Y)=(X5,YY59) \rightarrow (F,G)=(+,-)$ $(X,Y)=(X5,YY58) \rightarrow (F,G)=(0,-)$ $(X,Y)=(X5,YY57) \rightarrow (F,G)=(-,-)$ $(X,Y)=(X5,YY56) \rightarrow (F,G)=(-,0)$ $(X,Y)=(X5,YY55) \rightarrow (F,G)=(-,+)$ $(X,Y)=(X5,YY54) \rightarrow (F,G)=(-,0)$ $(X,Y)=(X5,YY53) \rightarrow (F,G)=(-,-)$ $(X,Y)=(X5,YY52) \rightarrow (F,G)=(0,-)$ $(X,Y)=(X5,YY51) \rightarrow (F,G)=(+,-)$ In addition, FIG. 21 depicts a state at X=X6. X6 is a value A of X, which satisfies "$X^3+X^2-1=0$". Namely, X=X6 is a straight line passing through a cross point of F(X, Y)=0 and G(X, Y)=0. Incidentally, YY62=Y61=−$A^{3/2}$, YY64=Y62=A3/2. (X6,YY62) corresponds to a point whose Y is a negative value among cross points of F(X, Y)=0 and G(X,Y)=0, and (X6, YY64) corresponds to a point whose Y is a positive value among cross points of F(X, Y)=0 and G(X, Y)=0. YY63 is a value between YY62 and YY64. However, YY63=0 is assumed. YY65 is a value greater than YY64 and YY61 is a value less than YY62. Then, following calculation results are obtained.

Figure 22:
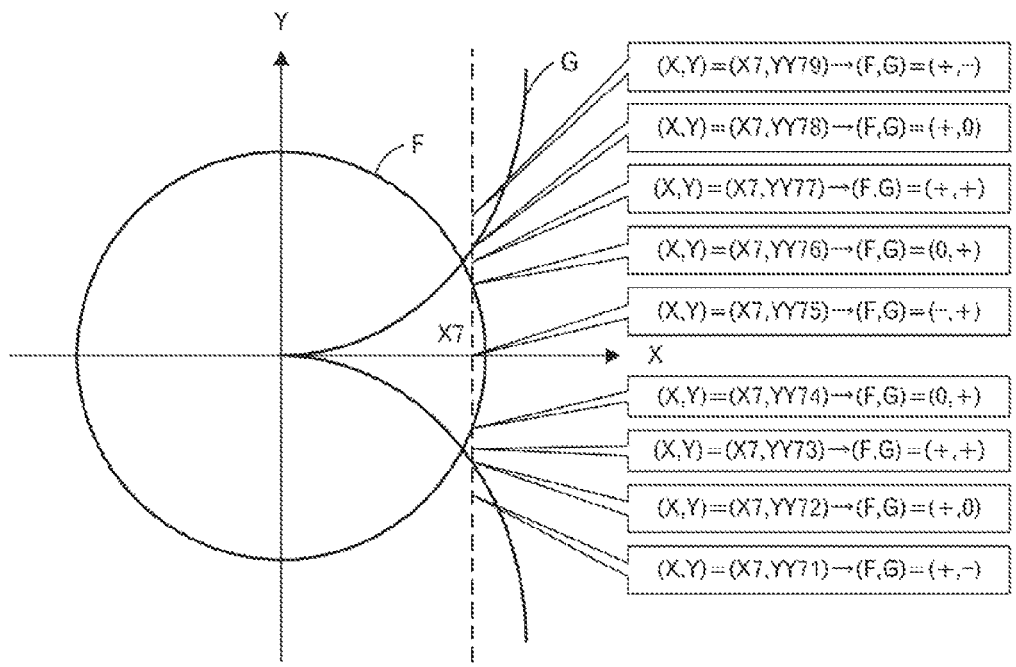
FIG. 22 is a diagram to explain the processing of the QE tool.

$(X,Y)=(X6,YY65) \rightarrow (F,G)=(+,-)$ $(X,Y)=(X6,YY64) \rightarrow (F,G)=(0,0)$ $(X,Y)=(X6,YY63) \rightarrow (F,G)=(-,+)$ $(X,Y)=(X6,YY62) \rightarrow (F,G)=(0,0)$ $(X,Y)=(X6,YY61) \rightarrow (F,G)=(+,-)$ Furthermore, FIG. 22 depicts a state at X=X7. X7 is a value between X6 and X=1. In addition, (X7,YY72=Y71) is a point whose Y is a negative value among cross points of X=X7 and G(X, Y)=0. (X7,YY74=Y72) is a point whose Y is a negative value among cross points of X=X7 and F(X, Y)=0. (X7, YY76=Y73) is a point whose Y is a positive value among cross points of X=X7 and F(X, Y)=0. (X7, YY78=Y74) is a point whose Y is a positive value among X=X7 and G(X, Y)=0. YY71 is a value less than YY72, YY73 is a value between YY72 and YY74, YY75 is a value between YY74 and YY76. However, YY75=0, here. In addition, YY77 is a value between YY76 and YY78, and YY79 is a value greater than YY78. Then, following calculation results are obtained.

Figure 23:
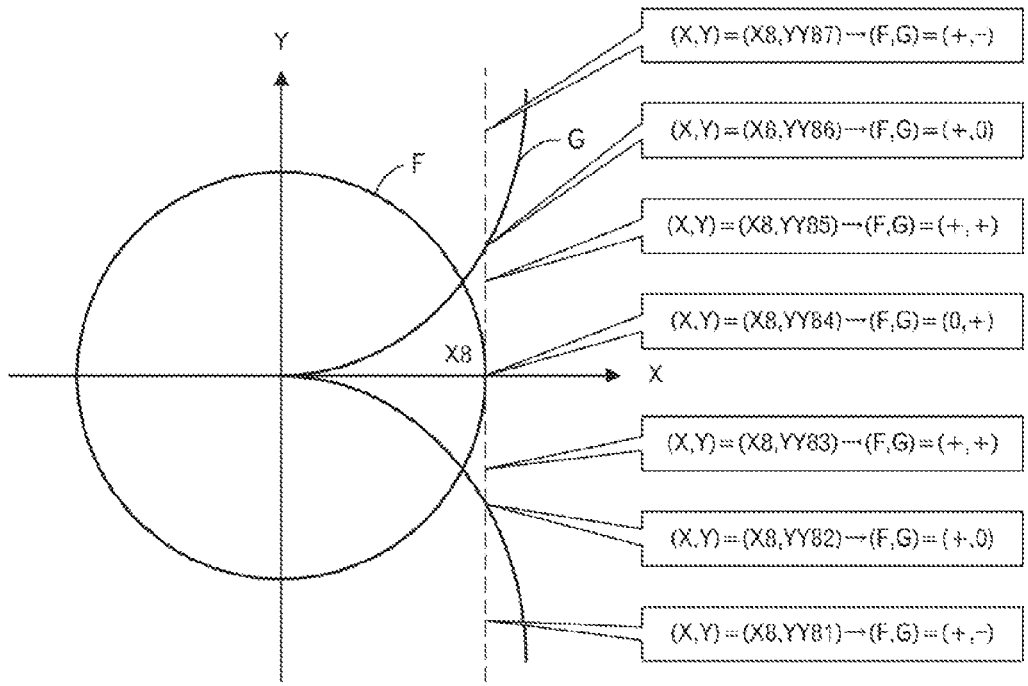
FIG. 23 is a diagram to explain the processing of the QE tool.

$(X,Y)=(X7,YY79) \rightarrow (F,G)=(+,-)$ $(X,Y)=(X7,YY78) \rightarrow (F,G)=(+,0)$ $(X,Y)=(X7,YY77) \rightarrow (F,G)=(+,+)$ $(X,Y)=(X7,YY76) \rightarrow (F,G)=(0,+)$ $(X,Y)=(X7,YY75) \rightarrow (F,G)=(-,+)$ $(X,Y)=(X7,YY74) \rightarrow (F,G)=(0,+)$ $(X,Y)=(X7,YY73) \rightarrow (F,G)=(+,+)$ $(X,Y)=(X7,YY72) \rightarrow (F,G)=(+,0)$ $(X,Y)=(X7,YY71) \rightarrow (F,G)=(+,-)$ In addition, FIG. 23 depicts a state at X=X8=1. YY82=Y81=−1, YY84=Y82=0, and YY86=Y83=1. Therefore, YY81 is a value less than "−1", YY83 is a value greater than "−1" and less than "0", YY85 is a value greater than "0" and less than "1", and YY87 is a value greater than "1". Then, following calculation results are obtained.

Figure 24:
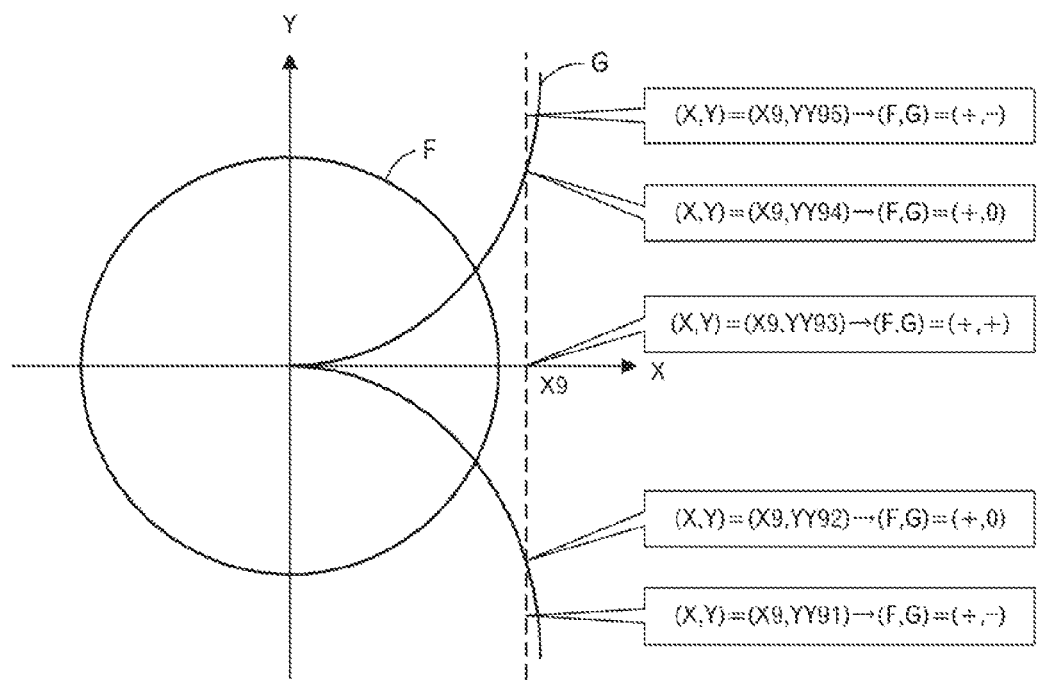
FIG. 24 is a diagram to explain the processing of the QE tool.

$(X,Y)=(X8,YY87) \rightarrow (F,G)=(+,-)$ $(X,Y)=(X8,YY86) \rightarrow (F,G)=(+,0)$ $(X,Y)=(X8,YY85) \rightarrow (F,G)=(+,+)$ $(X,Y)=(X8,YY84) \rightarrow (F,G)=(0,+)$ $(X,Y)=(X8,YY83) \rightarrow (F,G)=(+,+)$ $(X,Y)=(X8,YY82) \rightarrow (F,G)=(+,0)$ $(X,Y)=(X8,YY81) \rightarrow (F,G)=(+,-)$ Furthermore, FIG. 24 depicts a state at X=X9 >1. (X9, YY92=Y91) is a point whose Y is a negative value among cross points of X=X9 and G(X, Y)=0. (X9, YY94=Y92) is a point whose Y is a positive value among cross points X=X9 and G(X, Y)=0. In addition, YY91 is a value less than YY92, and YY95 is a value greater than YY94. YY93 is a point between YY92 and YY94. However, YY93=0 is assumed, here. Then, following calculation results are obtained.

$$(X,Y)=(X9,YY95) \rightarrow (F,G)=(+,-)$$

$$(X,Y)=(X9,YY94) \rightarrow (F,G)=(+,0)$$

$$(X,Y)=(X9,YY93) \rightarrow (F,G)=(+,+)$$

$$(X,Y)=(X9,YY92) \rightarrow (F,G)=(+,0)$$

$$(X,Y)=(X9,YY91) \rightarrow (F,G)=(+,-)$$

(5-2) Select points satisfying (F, G)=(−, 0)

This is because the constraints include G(X,Y)=0 and F(X,Y)=Z<0. (X, Y)=(X4, YY44), (X5, YY54), (X5, YY56).

(6) Calculation step 6

(6-1) Calculate conditions satisfying (X, Y)=(X4, YY44)

As you can understand from FIG. 19 and the aforementioned explanation, (X, Y)=(X4, YY44)=(0, 0) is satisfied.

(6-2) Calculate conditions satisfying (X, Y)=(X5, YY54)

As you can understand from FIG. 20 and the aforementioned explanation, X5 satisfies 0<X<A. In addition, Y<YY55=0. Furthermore, because the solutions are points on G(X, Y)=0, $X^3-Y^2=0$.

(6-3) Calculate conditions satisfying (X, Y)=(X5, YY56)

As you can understand from FIG. 20 and the aforementioned explanation, X5 satisfies 0<X<A. In addition, Y>YY5. Furthermore, because the solutions are points on G(X, Y)=0, $X^3-Y^2=0$.

(7) Calculation step 7

Figure 25:
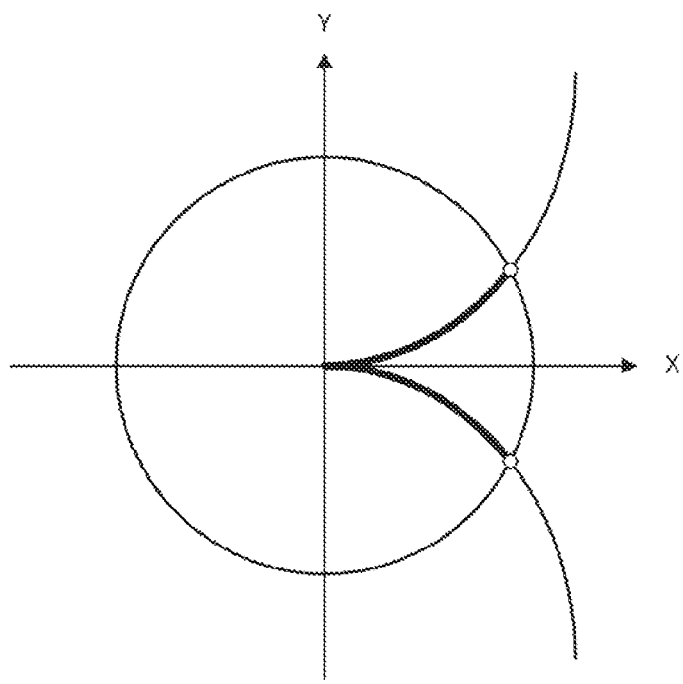
FIG. 25 is a diagram to explain the processing of the QE tool.

Put conditions, which was calculated at the calculation step 6 and satisfies (X, Y)=(X4, YY44), (X, Y)=(X5, YY54) or (X, Y)=(X5, YY56), in order. In this example, because there is (X, Y)=(X4, Y44), (X, Y)=(0, 0) is included. Therefore, $X^3-Y^2=0$ AND 0<X<A is obtained. Namely, as depicted in FIG. 25, a portion on the curve G(X, Y)=0 is a feasible region.

The embodiments are outlined as follows:

This optimization processing method includes: (A) obtaining values of evaluation indicators by generating a plurality of sets of values of design parameters and causing a simulator to carry out simulation for each of the plurality of sets and generating a first model expression having a first order and representing a relationship between the evaluation indicators and the design parameters and a second model expression having a second order higher than the first order and representing a relationship between the evaluation indicators and the design parameters, and storing the first model expression and the second model expression into a model expression storage unit; (B) causing a processing unit executing a processing according to a quantifier elimination method to calculate values of the design parameters, which realize an optimum solution of the first model expression, from the first model expression stored in the model expression storage unit and a predetermined constraint, and storing the calculated values of the design parameters into a design parameter value storage unit; (C) identifying a design parameter whose value stored in the design parameter value storage unit is identical to an upper limit value or a lower limit value, which is included in the predetermined constraint, and transforming the second model expression by substituting the upper limit value or the lower limit value, as a value of the identified design parameter, for the second model expression stored in the model expression storage unit; and (D) causing the processing unit to calculate values of the design parameters in the transformed second model expression, which realize an optimum solution of the transformed second model expression, from the transformed second model expression and a constraint relating to the design parameters in the transformed second model expression, and storing the calculated values of the design parameters in the transformed second model expression into the design parameter value storage unit.

By using characteristics that a lot of design parameter values become the upper limit value or lower limit value, the design parameter values in the first model expression, which become the upper limit value or lower limit value, can be identified at high speed. When this result is applied to the second model expression to simplify the second model expression, it becomes possible to process the second model expression at high speed. Namely, the processing speed is enhanced while keeping the accuracy as a whole.

In addition, this optimization processing method may further include: (E) extracting a first design parameter satisfying a condition of an influence degree to the first model expression stored in the model expression data storage unit from among second design parameters whose values stored in the design parameter value storage unit is identical to an upper limit value or a lower limit value, which is included in the predetermined constraint; (F) generating a second transformed expression of the second model expression by substituting the upper limit value or the lower limit value as values of third design parameters other than the first design parameter among the second design parameters for the second model expression stored in the model expression storage unit; and (G) causing the processing unit to calculate values of the design parameters in the second transformed expression, which realize an optimum solution of the second transformed expression, from the second transformed expression and a constraint relating to the design parameters in the second transformed expression, and storing the calculated values of the design parameters in the second transformed expression into the design parameter value storage unit.

Thus, it becomes possible to evaluate the validity of the design parameter values obtained from the first model expression.

Figure 26:
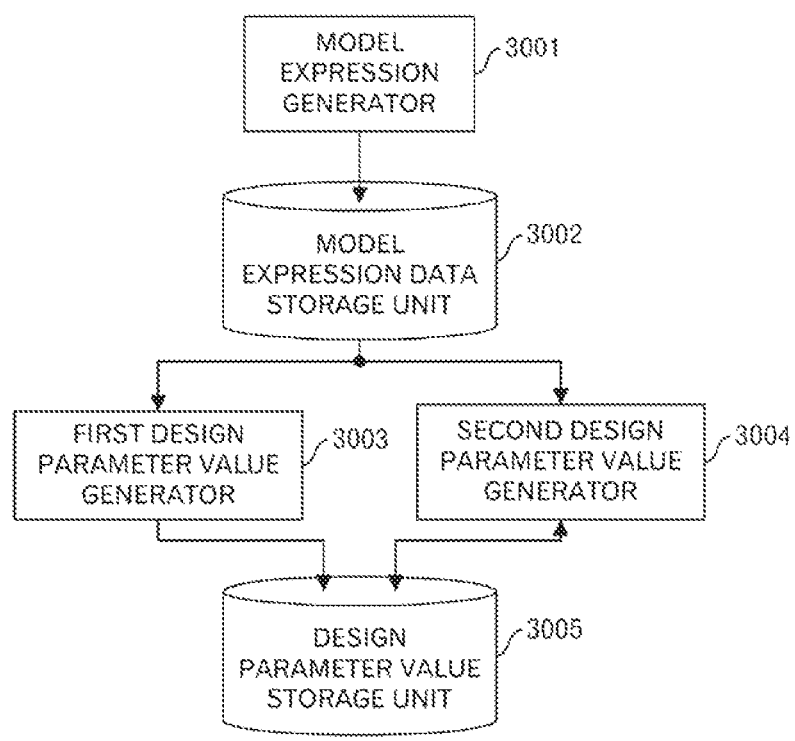
FIG. 26 is a functional block diagram depicting an optimization processing apparatus.

In addition, this optimization processing apparatus (FIG. 26) includes: (A) a model expression generator (FIG. 26: 3001) to obtain values of evaluation indicators by generating a plurality of sets of values of design parameters, and causing a simulator to carry out simulation for each of the plurality of sets, and to generate a first model expression having a first order and representing a relationship between the evaluation indicators and the design parameters and a second model expression having a second order higher than the first order and representing a relationship between the evaluation indicators and the design parameters, and to store the first model expression and the second model expression into a model expression storage unit (FIG. 26: 3002); (B) a first design parameter value generator (FIG. 26: 3003) to cause a processing unit executing a processing according to a quantifier elimination method to calculate values of the design parameters, which realize an optimum solution of the first model expression, from the first model expression stored in the model expression storage unit and a predetermined constraint, and to store the calculated values of the design parameters into a design parameter value storage unit (FIG. 26: 3005); and (C) a second model parameter value generator (FIG. 26: 3004) to identify a design parameter whose value stored in the design parameter value storage unit is identical to an upper limit value or a lower limit value, which is included in the predetermined constraint, to transform the second model expression by substituting the upper limit value or the lower limit value, as a value of the identified design parameter, for the second model expression stored in the model expression storage unit, to cause the processing unit to calculate values of the design parameters in the transformed second model expression, which realize an optimum solution of the transformed second model expression, from the transformed second model expression and a constraint relating to the design parameters in the transformed second model expression, and to store the calculated values of the design parameters in the transformed second model expression into the design parameter value storage unit.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory medium storing a program for causing a computer to execute a procedure, said procedure comprising:
   obtaining values of evaluation indicators by generating a plurality of sets of values of design parameters and causing a simulator to carry out simulation for each of said plurality of sets;
   generating a first model expression having a first order and representing a relationship between said evaluation indicators and said design parameters and a second model expression having a second order higher than said first order and representing a relationship between said evaluation indicators and said design parameters, and storing said first model expression and said second model expression into a model expression storage unit;
   calculating values of said design parameters according to a quantifier elimination method, from said first model expression stored in the model expression storage unit and a predetermined constraint, said design parameters realizing an optimum solution of said first model expression, and storing the calculated values of said design parameters into a design parameter value storage unit;
   identifying a design parameter whose value stored in said design parameter value storage unit is identical to an upper limit value or a lower limit value, which is included in said predetermined constraint, and transforming said second model expression by substituting said upper limit value or said lower limit value, as a value of said identified design parameter, for said second model expression stored in said model expression storage unit; and
   calculating values of said design parameters in the transformed second model expression, which realize an optimum solution of said transformed second model expression, from said transformed second model expression and a constraint relating to said design parameters in the transformed second model expression, and storing the calculated values of said design parameters in the transformed second model expression into said design parameter value storage unit.

2. The computer-readable non-transitory medium according to claim 1, wherein said procedure further comprises:
   extracting a first design parameter satisfying a condition of an influence degree to said first model expression stored in said model expression data storage unit from among second design parameters whose values stored in said design parameter value storage unit is identical to an upper limit value or a lower limit value, which is included in said predetermined constraint;
   generating a second transformed expression of said second model expression by substituting said upper limit value or said lower limit value as values of third design parameters other than said first design parameter among said second design parameters for said second model expression stored in said model expression storage unit; and
   calculating values of said design parameters in said second transformed expression, which realize an optimum solution of said second transformed expression, from said second transformed expression and a constraint relating to said design parameters in said second transformed expression, and storing the calculated values of said design parameters in said second transformed expression into said design parameter value storage unit.

3. An optimization processing method executed by a computer, comprising:
   obtaining values of evaluation indicators by generating a plurality of sets of values of design parameters and causing a simulator to carry out simulation for each of said plurality of sets;
   generating a first model expression having a first order and representing a relationship between said evaluation indicators and said design parameters and a second model expression having a second order higher than said first order and representing a relationship between said evaluation indicators and said design parameters, and storing said first model expression and said second model expression into a model expression storage unit;
   calculating values of said design parameters, which realize an optimum solution of said first model expression, from said first model expression stored in the model expression storage unit and a predetermined constraint, and storing the calculated values of said design parameters into a design parameter value storage unit;
   identifying a design parameter whose value stored in said design parameter value storage unit is identical to an upper limit value or a lower limit value, which is included in said predetermined constraint, and transforming said second model expression by substituting said upper limit value or said lower limit value, as a value of said identified design parameter, for said second model expression stored in said model expression storage unit; and
   calculating values of said design parameters in the transformed second model expression, which realize an optimum solution of said transformed second model expression, from said transformed second model expression and a constraint relating to said design parameters in the transformed second model expression, and storing the calculated values of said design parameters in the transformed second model expression into said design parameter value storage unit.

4. The optimization processing method according to claim 3, further comprising:
   extracting a first design parameter satisfying a condition of an influence degree to said first model expression stored in said model expression data storage unit from among second design parameters whose values stored in said design parameter value storage unit is identical to an upper limit value or a lower limit value, which is included in said predetermined constraint;

generating a second transformed expression of said second model expression by substituting said upper limit value or said lower limit value as values of third design parameters other than said first design parameter among said second design parameters for said second model expression stored in said model expression storage unit; and causing said processing unit to calculate values of said design parameters in said second transformed expression, which realize an optimum solution of said second transformed expression, from said second transformed expression and a constraint relating to said design parameters in said second transformed expression, and storing the calculated values of said design parameters in said second transformed expression into said design parameter value storage unit.

5. An optimization processing apparatus, comprising:
a model expression storage unit;
a model expression generator to obtain values of evaluation indicators by generating a plurality of sets of values of design parameters, and causing a simulator to carry out simulation for each of said plurality of sets, to generate a first model expression having a first order and representing a relationship between said evaluation indicators and said design parameters and a second model expression having a second order higher than said first order and representing a relationship between said evaluation indicators and said design parameters, and to store said first model expression and said second model expression into said model expression storage unit;
a first design parameter value generator to cause a processing unit executing a processing according to a quantifier elimination method to calculate values of said design parameters, which realize an optimum solution of said first model expression, from said first model expression stored in the model expression storage unit and a predetermined constraint, and to store the calculated values of said design parameters into a design parameter value storage unit; and
a second model parameter value generator to identify a design parameter whose value stored in said design parameter value storage unit is identical to an upper limit value or a lower limit value, which is included in said predetermined constraint, to transform said second model expression by substituting said upper limit value or said lower limit value, as a value of said identified design parameter, for said second model expression stored in said model expression storage unit, to cause said processing unit to calculate values of said design parameters in the transformed second model expression, which realize an optimum solution of said transformed second model expression, from said transformed second model expression and a constraint relating to said design parameters in the transformed second model expression, and to store the calculated values of said design parameters in the transformed second model expression into said design parameter value storage unit.

6. The optimization processing apparatus according to claim 5, further comprising:

a third design parameter value generator to extract a first design parameter satisfying a condition of an influence degree to said first model expression stored in said model expression data storage unit from among second design parameters whose values stored in said design parameter value storage unit is identical to an upper limit value or a lower limit value, which is included in said predetermined constraint, to generate a second transformed expression of said second model expression by substituting said upper limit value or said lower limit value as values of third design parameters other than said first design parameter among said second design parameters for said second model expression stored in said model expression storage unit, to cause said processing unit to calculate values of said design parameters in said second transformed expression, which realize an optimum solution of said second transformed expression, from said second transformed expression and a constraint relating to said design parameters in said second transformed expression, and to store the calculated values of said design parameters in said second transformed expression into said design parameter value storage unit.

7. An optimization processing apparatus, comprising:
a memory; and
a processor configured to execute a procedure, the procedure comprising:
obtaining values of evaluation indicators by generating a plurality of sets of values of design parameters and causing a simulator to carry out simulation for each of said plurality of sets;
generating a first model expression having a first order and representing a relationship between said evaluation indicators and said design parameters and a second model expression having a second order higher than said first order and representing a relationship between said evaluation indicators and said design parameters, and storing said first model expression and said second model expression into said memory;
calculating values of said design parameters, which realize an optimum solution of said first model expression, from said first model expression stored in said memory and a predetermined constraint, and storing the calculated values of said design parameters into said memory;
identifying a design parameter whose value stored in said memory is identical to an upper limit value or a lower limit value, which is included in said predetermined constraint, and transforming said second model expression by substituting said upper limit value or said lower limit value, as a value of said identified design parameter, for said second model expression stored in said memory; and
calculating values of said design parameters in the transformed second model expression, which realize an optimum solution of said transformed second model expression, from said transformed second model expression and a constraint relating to said design parameters in the transformed second model expression, and storing the calculated values of said design parameters in the transformed second model expression into said memory.

* * * * *